(12) United States Patent
Sakong et al.

(10) Patent No.: US 11,616,294 B2
(45) Date of Patent: Mar. 28, 2023

(54) ANTENNA FOR WIRELESS COMMUNICATION AND ELECTRONIC DEVICE INCLUDING THE SAME

(71) Applicant: Samsung Electronics Co., Ltd., Gyeonggi-do (KR)

(72) Inventors: Min Sakong, Gyeongsangbuk-do (KR); Dong Ryul Shin, Daegu (KR); Yoon Jae Lee, Seoul (KR); Seong Tae Jeong, Gyeonggi-do (KR); Jin Woo Jung, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/306,508

(22) Filed: May 3, 2021

(65) Prior Publication Data

US 2021/0257728 A1  Aug. 19, 2021

Related U.S. Application Data

(63) Continuation of application No. 15/656,669, filed on Jul. 21, 2017, now Pat. No. 10,998,622.

(30) Foreign Application Priority Data

Jul. 21, 2016 (KR) .................. 10-2016-0092871
Mar. 28, 2017 (KR) .................. 10-2017-0039558

(51) Int. Cl.
*H01Q 1/24* (2006.01)
*H01Q 3/00* (2006.01)
(Continued)

(52) U.S. Cl.
CPC .............. *H01Q 3/00* (2013.01); *H01Q 1/243* (2013.01); *H01Q 1/245* (2013.01); *H01Q 1/48* (2013.01); *H04B 1/3838* (2013.01)

(58) Field of Classification Search
CPC .......... H01Q 1/243; H01Q 1/245; H01Q 1/48; H01Q 5/378; H01Q 5/35
See application file for complete search history.

(56) References Cited

U.S. PATENT DOCUMENTS 7,100,127 B2  8/2006  Chen et al.
8,022,888 B2  9/2011  Kim et al.
(Continued)

FOREIGN PATENT DOCUMENTS

CN    103633451    3/2014
CN    103636061    3/2014
(Continued)

OTHER PUBLICATIONS

International Search Report dated Nov. 9, 2017 issued in counterpart application No. PCT/KR2017/007887, 3 pages.
(Continued)

*Primary Examiner* — Awat M Salih
(74) *Attorney, Agent, or Firm* — The Farrell Law Firm, P.C.

(57) ABSTRACT

A communication method performed in an electronic device including a conductive pattern and the electronic device are provided. The electronic device includes a conductive pattern used as a radiator for wireless communication, a feeding unit connected with the conductive pattern, a ground unit connected with the conductive pattern, a first impedance matching circuit disposed in a first area adjacent to the feeding unit and connected to the conductive pattern, a second impedance matching circuit disposed in a second area adjacent to the conductive pattern and connected to the conductive pattern, and a control unit that matches impedance by controlling at least one of the first impedance matching circuit and the second impedance matching circuit by a closed-loop scheme.

12 Claims, 19 Drawing Sheets

(51) Int. Cl.
*H01Q 1/48* (2006.01)
*H04B 1/3827* (2015.01)

(56) References Cited

U.S. PATENT DOCUMENTS

| | | | |
|---|---|---|---|
| 8,542,078 B2 | 9/2013 | de Jongh et al. | |
| 8,674,889 B2 | 3/2014 | Bengtsson et al. | |
| 8,836,587 B2 | 9/2014 | Darnell et al. | |
| 9,000,993 B2 | 4/2015 | Jeon et al. | |
| 9,054,756 B2 | 6/2015 | See et al. | |
| 9,172,138 B2 | 10/2015 | Xue | |
| 9,264,011 B2 | 2/2016 | Ishizuka et al. | |
| 9,281,562 B2 | 3/2016 | Karkinen et al. | |
| 9,306,288 B2 | 4/2016 | Park et al. | |
| 9,325,062 B2 | 4/2016 | Pajona et al. | |
| 9,502,752 B2 | 11/2016 | Darnell et al. | |
| 9,705,180 B2 | 7/2017 | Darnell et al. | |
| 9,985,351 B2 | 5/2018 | Kim et al. | |
| 10,128,883 B2 | 11/2018 | Park et al. | |
| 2004/0128629 A1 | 7/2004 | Chen et al. | |
| 2007/0285326 A1 | 12/2007 | McKinzie | |
| 2008/0261544 A1 | 10/2008 | Blin | |
| 2009/0021325 A1 | 1/2009 | Lee et al. | |
| 2009/0224996 A1 | 9/2009 | Kim et al. | |
| 2010/0085260 A1 | 4/2010 | McKinzie et al. | |
| 2011/0014886 A1 | 1/2011 | Manssen et al. | |
| 2011/0063042 A1 | 3/2011 | Mendolia et al. | |
| 2011/0076966 A1* | 3/2011 | Ishimiya | H04B 1/0458 455/78 |
| 2011/0148723 A1 | 6/2011 | Bengtsson et al. | |
| 2011/0163935 A1 | 7/2011 | de Jongh et al. | |
| 2013/0027260 A1 | 1/2013 | Jeon et al. | |
| 2013/0069737 A1 | 3/2013 | See et al. | |
| 2013/0088399 A1 | 4/2013 | Jeon et al. | |
| 2013/0184038 A1 | 7/2013 | Park et al. | |
| 2013/0187829 A1 | 7/2013 | Pajona et al. | |
| 2013/0257659 A1 | 10/2013 | Darnell et al. | |
| 2013/0285873 A1* | 10/2013 | Dupuy | H01Q 21/30 343/852 |
| 2014/0055317 A1 | 2/2014 | Xue | |
| 2014/0062817 A1 | 3/2014 | Ishizuka et al. | |
| 2014/0152522 A1* | 6/2014 | Karkinen | H01Q 5/35 343/803 |
| 2015/0002348 A1* | 1/2015 | Wong | H01Q 9/42 343/724 |
| 2015/0035706 A1 | 2/2015 | Darnell et al. | |
| 2015/0042537 A1 | 2/2015 | du Toit et al. | |
| 2015/0200463 A1 | 7/2015 | Heikura et al. | |
| 2015/0364813 A1* | 12/2015 | Darnell | H01Q 1/48 343/702 |
| 2016/0028157 A1 | 1/2016 | Kim et al. | |
| 2016/0036127 A1 | 2/2016 | Desclos et al. | |
| 2016/0211874 A1 | 7/2016 | Park et al. | |
| 2019/0044558 A1 | 2/2019 | Park et al. | |

FOREIGN PATENT DOCUMENTS

| | | |
|---|---|---|
| CN | 103828247 | 5/2014 |
| CN | 104040791 | 9/2014 |
| CN | 104852122 | 8/2015 |
| EP | 0 973 270 | 1/2000 |
| EP | 2 615 684 | 7/2013 |
| WO | WO 2009/155966 | 12/2009 |
| WO | WO 2012/153692 | 11/2012 |
| WO | WO 2013/005080 | 1/2013 |

OTHER PUBLICATIONS

European Search Report dated May 20, 2019 issued in counterpart application No. 17831385.4-1220, 9 pages.
Chinese Office Action dated Oct. 31, 2019 issued in counterpart application No. 201710599003.5, 22 pages.
Chinese Office Action dated Jul. 13, 2020 issued in counterpart application No. 201710599003.5, 11 pages.
Chinese Office Action dated Jan. 5, 2022 issued in counterpart application No. 202110188031.4, 17 pages.

* cited by examiner

ANTENNA FOR WIRELESS COMMUNICATION AND ELECTRONIC DEVICE INCLUDING THE SAME

PRIORITY

This application is a Continuation of application Ser. No. 15/656,669, filed with the U.S. Patent and Trademark Office on Jul. 21, 2017, and claims priority under 35 U.S.C. § 119(a) to Korean Patent Applications filed in the Korean Intellectual Property Office on Jul. 21, 2016 and Mar. 28, 2017, and assigned Serial Nos. 10-2016-0092871 and 10-2017-0039558, respectively, the entire disclosure of each of which is incorporated herein by reference.

BACKGROUND

1. Field of the Disclosure

The present disclosure relates generally to an antenna capable of performing wireless communication with an external device and an electronic device including the antenna.

2. Description of the Related Art

An electronic device, such as a smartphone, a tablet PC, or the like, may transmit and receive a variety of data to and from an external device. The electronic device may perform long distance communication (e.g., mobile communication, such as voice call or wireless data communication), short range communication (e.g., Bluetooth communication or Wi-Fi communication), or ultra-short range communication (e.g., wireless payment, wireless charging, or near-field communication (NFC)).

Communication performance of an antenna may vary with a location of a peripheral object or the like. For example, a resonant frequency and the efficiency of radiation may vary with various situations, such as 1) when there is no object adjacent to an antenna, 2) when a user is adjacent to the antenna, and 3) when a user grips a portion of the antenna portion. To maintain stable communication performance, the electronic device may control either a switch or a tuner having a variable capacitor to perform impedance matching. In this case, since a matching value is controlled at an input terminal of the antenna, a range of an impedance matching area may be restricted, and it may be difficult to effectively cope with various radiation environments.

Also, since a conventional electronic device that matches impedance by using a radio frequency (RF) element, such as a switch, is designed based on a case where the user is adjacent to a radiator of an antenna, it is difficult to perform impedance matching to correspond to various situations.

SUMMARY

The present disclosure has been made to address at least the above-mentioned problems and/or disadvantages and to provide at least the advantages described below.

Accordingly, an aspect of the present disclosure provides an electronic device that performs impedance matching to correspond to various peripheral situations by using a matching circuit connected to a conductive pattern.

Another aspect of the present disclosure provides an electronic device that includes a conductive pattern configured as a radiator for wireless communication and forming at least part of a metal frame of the electronic device exposed to an outside; a feeding unit; an impedance measurement unit; a first impedance matching circuit disposed in a first area adjacent to the feeding unit, with a first end of the first impedance matching circuit connected to the feeding unit, and a second end of the first impedance matching circuit connected to the conductive pattern, with the first impedance matching circuit including a first variable capacitor connected between the feeding unit and the conductive pattern, a first switch connected between the feeding unit and the conductive pattern, a second switch connected between the conductive pattern and a ground, and a third switch connected between the feeding unit and the ground; a second impedance matching circuit disposed in a second area adjacent to the conductive pattern, with a first end of the second impedance matching circuit connected to the conductive pattern and a second end of the second impedance matching circuit connected to the ground; and a control unit configured to: determine a mode for impedance matching based on an input impedance value measured via the impedance measurement unit; and match impedance by selectively controlling at least one matching circuit of the first impedance matching circuit or the second impedance matching circuit based on the determined mode.

A further aspect of the present disclosure provides a communication chip that includes a control unit that determines a mode for impedance matching for a portable communication device in which the communication chip is to be disposed, the determining based on an input impedance value measured via an impedance measurement unit included in the portable communication device; and, based at least in part on the determined mode, matches impedance by selectively controlling at least one matching circuit of a first impedance matching circuit or a second impedance matching circuit included in the portable communication device, with the first impedance matching circuit connected between a portion of a metal frame of the portable communication device and a feeding portion feeding the portion of the metal frame such that the portion of the metal frame is to be used as an antenna radiator, and the second impedance matching circuit being connected between the portion of the metal frame and a ground.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION

Figure 1:
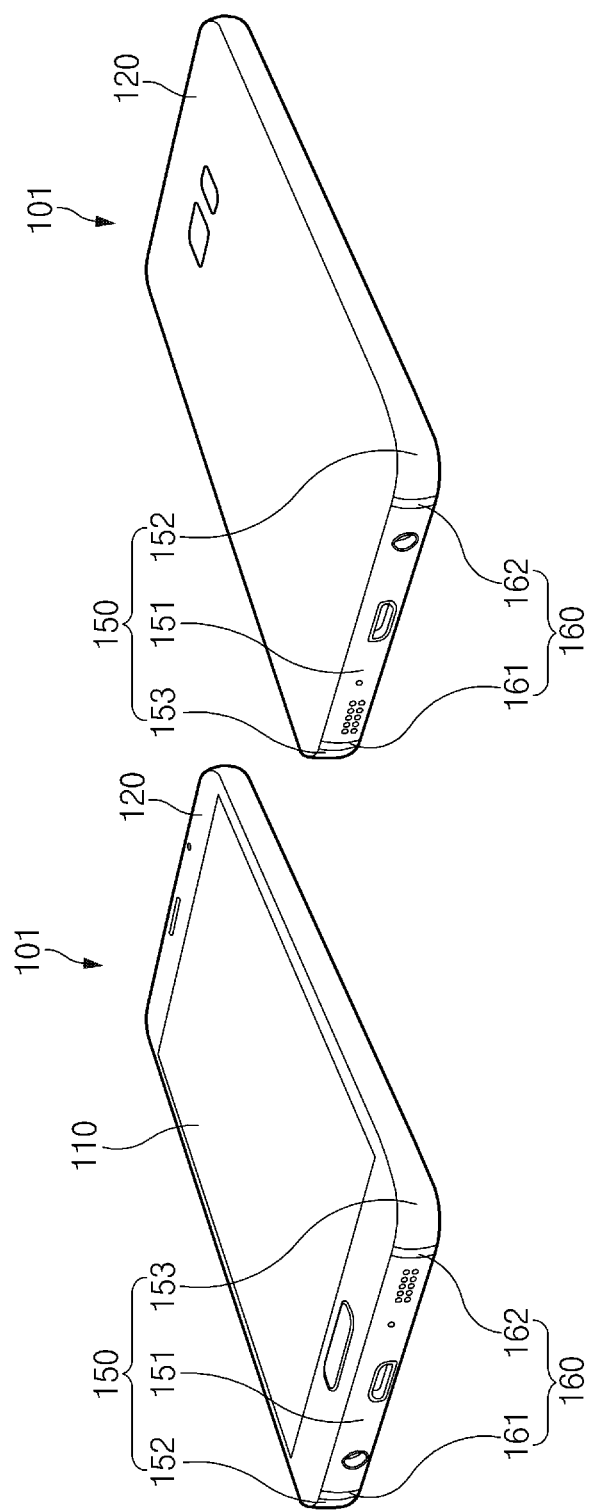
FIG. 1 illustrates an electronic device including an antenna for wireless communication, according to an embodiment of the present disclosure.

Hereinafter, various embodiments of the present disclosure will be described with reference to the accompanying drawings, in which like reference numerals refer to like elements. However, the present disclosure is not intended to be limited to the various embodiments described herein. Accordingly, those of ordinary skill in the art will recognize that modification, equivalent, and/or alternative on the various embodiments described herein can be made without departing from the scope and spirit of the present disclosure.

The expressions "have", "include", and "comprise" used herein indicate the existence of one or more corresponding features (for example, elements, such as numeric values, functions, operations, or components), but do not exclude the presence of additional features.

The expressions "A or B", "at least one of A or/and B", or "one or more of A or/and B", used herein may include any and all combinations of one or more of the associated listed items. For example, the term "A or B", "at least one of A and B", or "at least one of A or B" may refer to all of (1) A (2) B, or (3) A and B.

Terms, such as "first", "second", and the like, used herein, may be used to modify various elements of various embodiments of the present disclosure regardless of the order of importance, but do not limit the elements. For example, such terms are used only to distinguish an element from another element and do not limit the order and/or priority of the elements. For example, a first user device and a second user device may represent different user devices irrespective of sequence or importance. For example, without departing from the scope of the present disclosure, a first element may be referred to as a second element, and similarly, a second element may be referred to as a first element.

It should be understood that when an element (for example, a first element) is referred to as being "coupled" or "connected" with/to another element (for example, a second element), the element can be directly coupled or connected with/to the other element or an intervening element (for example, a third element) may be present. In contrast, when an element (for example, a first element) is referred to as being "directly coupled" or "directly connected" with/to another element (for example, a second element), it should be understood that there are no intervening element (for example, a third element).

The expression "configured to", as used herein, may be used interchangeably with the expressions "suitable for", "having the capacity to", "designed to", "adapted to", "made to", or "capable of". The term "configured to (or set to)" does not mean only "specifically designed to" in hardware. For example, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used herein are used to describe specified embodiments of the present disclosure and are not intended to limit the scope of the present disclosure. The terms of a singular form may include plural forms as well, unless otherwise specified. Unless otherwise defined herein, all the terms used herein, including technical or scientific terms, may have the same meanings as those commonly understood by a person skilled in the art to which the present disclosure pertains. It will be further understood that terms, which are defined in a generally used dictionary, should be interpreted as is customary in the relevant related art and not in an idealized or overly formal manner unless expressly so defined. In some cases, even if terms are defined herein, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. The wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include at least one of a digital versatile disk (DVD) player, an audio device, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (such as, a blood glucose meter, a heart rate measuring device, a blood pressure measuring device, and a body temperature measuring device), a magnetic resonance angiography (MRA) device, a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, an electronic device for vessels (for example, a navigation device for vessels and a gyro compass), an avionics device, a security device, a vehicular head unit, an industrial or home robot, an automatic teller machine (ATM), a point of sales (POS) device, or an Internet of Things (IoT) device (for example, a light bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water, electricity, gas, or electric wave measuring device).

The electronic device according to an embodiment of the present disclosure may be a flexible electronic device.

The electronic device may be one or a combination of the aforementioned devices.

Further, the electronic device according to an embodiment of the present disclosure is not limited to the aforementioned devices, but may include new electronic devices produced due to the future development of technologies.

Hereinafter, electronic devices according to an embodiment of the present disclosure will be described with reference to the accompanying drawings. The term "user" used herein may refer to a person who uses an electronic device or may refer to a device (for example, an artificial intelligence electronic device) that uses an electronic device.

FIG. 1 illustrates an electronic device including an antenna for wireless communication, according to an embodiment of the present disclosure.

Referring to FIG. 1, an electronic device 101 is provided. The electronic device 101 may be a device such as a smartphone or a tablet PC, and may transmit and receive data to and from an external device through various communication schemes such as long distance communication (e.g., mobile communication, such as voice call or wireless data communication), short range communication (e.g., Bluetooth communication or Wi-Fi communication), or ultra-short range communication (e.g., wireless payment, wireless charging, or NFC). The electronic device 101 may include various antennas for executing the communication schemes.

The electronic device 101 includes a display 110 and a housing (or a body) 120. The display 110 may output various content to be provided to a user and may receive an input from the user through a touch input. The housing 120 may protect the display 110, the internal circuits, and the like. The display 110 and buttons may be mounted in the housing 120, and a processor, a module, a sensor, an antenna, a circuit board, or the like may be mounted in the housing 120 to drive the electronic device 101.

At least part of the housing 120 may be implemented with a conductive pattern, such as, a metal frame 150. The metal frame 150 may be connected with a feeding unit, a ground unit, and the like so as to be used as part of an antenna capable of transmitting and receiving a wireless signal to and from an external device. The metal frame 150 may be connected with a board (e.g., a printed circuit board (PCB)) and circuits within the housing 120.

In FIG. 1, the metal frame 150 is shown to surround a side surface area of the electronic device 101. However, embodiments of the present disclosure are not limited thereto. For example, at least part of the metal frame 150 may be disposed on a front surface (a surface on which the display 110 is disposed) or a rear surface (a surface on which a rear cover is disposed) of the electronic device 101.

The electronic device 101 includes a non-conductive pattern 160 disposed in the metal frame 150. The non-conductive pattern 160 may extend in a direction that is perpendicular to the front surface (the surface on which the display 110 is disposed) or the rear surface of the electronic device 101.

A first conductive pattern 151 to a third conductive pattern 153 may operate as a radiator of an antenna for wireless communication. The first conductive pattern 151 to the third conductive pattern 153 may form one or more antennas. For example, the first conductive pattern 151 and a second conductive pattern 152 may form a first antenna that transmits and receives a signal of a first frequency band, and the third conductive pattern 153 may independently form a second antenna that transmits and receives a signal of a second frequency band.

The antenna using the metal frame 150 includes one or more impedance matching circuits connected with the feeding unit or with the first conductive pattern 151 to the third conductive pattern 153. The antenna may perform impedance matching within a wider range by using a first impedance matching circuit (a "feeding matching circuit") connected to the feeding unit and a second impedance matching circuit (a "pattern matching circuit") connected with the metal frame 150. As such, communication efficiency or communication performance may be improved. Additional information about impedance matching using the feeding matching circuit or the pattern matching circuit may be given through FIGS. 2 to 10.

Figure 2A:
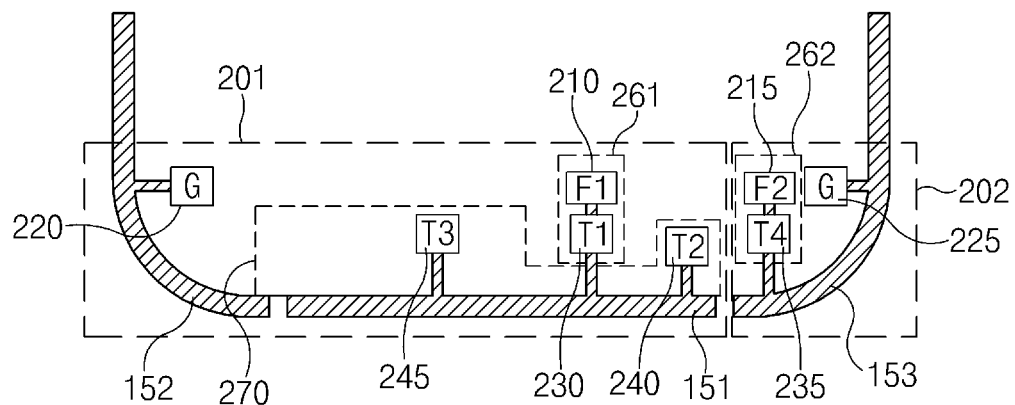
FIGS. 2A and 2B illustrate a plurality of antennas formed by using a metal frame of an electronic device, according to an embodiment of the present disclosure.
Figure 2B:
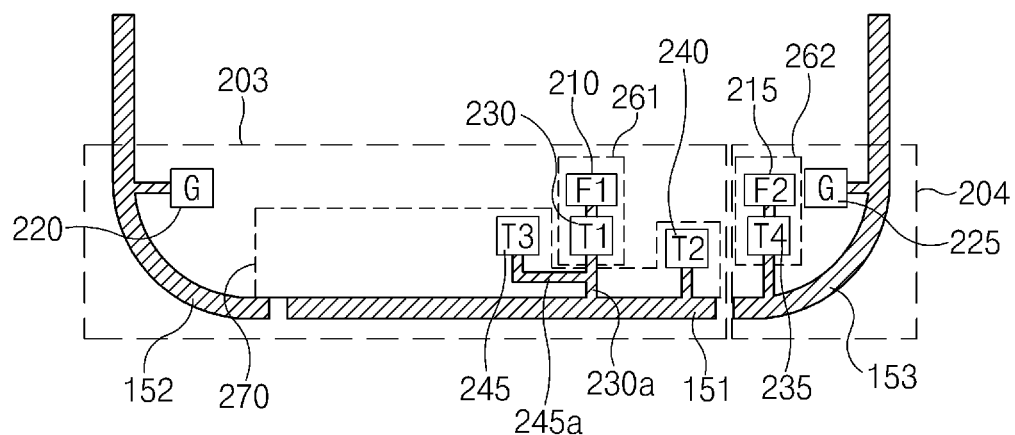

FIGS. 2A and 2B illustrate a plurality of antennas formed by using a metal frame of an electronic device, according to an embodiment of the present disclosure.

Referring to FIGS. 2A and 2B, a first antenna and a second antenna are formed at a lower end of a side surface of the electronic device 101. However, embodiments of the present disclosure are not limited thereto.

In FIGS. 2A and 2B, the first conductive pattern 151 and the second conductive pattern 152 form a first antenna 201 that transmits and receives a signal of the first frequency band and the third conductive pattern 153 forms a second antenna 202 that transmits and receives a signal of the second frequency band. However, embodiments of the present disclosure may not be limited thereto. For example, unlike the configurations shown in FIGS. 2A and 2B, one antenna may be formed by using the first to third conductive patterns 151 to 153, or the first to third conductive patterns 151 to 153 may form different antennas.

Referring to FIG. 2A, the first antenna 201 includes the first conductive pattern 151, the second conductive pattern 152, a first feeding unit 210, a first ground unit 220, a first feeding matching circuit (T1) 230, a first pattern matching circuit (T2) 240, and a second pattern matching circuit (T3) 245. The first antenna 201 may transmit and receive a signal of the first frequency band to and from an external device by using the first conductive pattern 151 and the second conductive pattern 152.

The first feeding unit 210 may connect the first conductive pattern 151 with a communication circuit (e.g., an RF circuit, an RF module, or the like) capable of transmitting and receiving an RF signal. The first feeding unit 210 may be a point at which RF power for an operation of the first antenna 210 is supplied. The first feeding unit 210 may be directly connected to the first conductive pattern 151 or may be connected to the first conductive pattern 151 through the first feeding matching circuit 230.

The first ground unit 220 may be connected to the second conductive pattern 152. An electrical length of a radiator may vary with connection locations of the first feeding unit 210 and the first ground unit 220, and a frequency band of a signal transmitted and received through the first antenna 201 may be changed according to the electrical length of the radiator.

The first feeding matching circuit 230 may be connected between the first feeding unit 210 and the first conductive pattern 151. A first end of the first feeding matching circuit 230 may be connected to the first feeding unit 210, and a second end thereof may be connected to the first conductive pattern 151.

The first feeding matching circuit 230 may be disposed (e.g., mounted in a PCB) in a first area, i.e., an impedance area 261 that is adjacent to the first feeding unit 210. The first feeding matching circuit 230 includes a variable element (e.g., a variable capacitor) and one or more switches, which are controlled through a control unit (e.g., a communication processor (CP) or a control module implemented to be independent of the CP). The first feeding matching circuit 230 may be used to match impedance of an input terminal of the first antenna 210.

Each of the first pattern matching circuit 240 and the second pattern matching circuit 245 may be connected to the first conductive pattern 151. Each of the first pattern matching circuit 240 and the second pattern matching circuit 245 may have a first end connected to the first conductive pattern 151 and a second end grounded (parallel connection). The first pattern matching circuit 240 and the second pattern matching circuit 245 may be disposed in different directions with respect to a point to which the first feeding unit 210 is connected.

The first pattern matching circuit 240 and the second pattern matching circuit 245 may be disposed in a second area, i.e., a field area 270 that corresponds to a space between the first conductive pattern 151 and a ground. The field area 270 may be an area in which a source field and a main current, by which a radiation characteristic is determined, are distributed.

Each of the first pattern matching circuit 240 and the second pattern matching circuit 245 includes a variable element (e.g., a variable capacitor) and one or more switches, which are controlled through a control unit (e.g., CP).

The control unit includes a closed-loop circuit. The control unit may match input impedance of the first antenna 201 by using the first feeding matching circuit 230, the first pattern matching circuit 240, and the second pattern matching circuit 245. The control unit may match impedance depending on a change in an object (e.g., a user, an accessory device, a cover, or the like) in the vicinity of the electronic device 101. The control unit may measure the input impedance continuously or periodically and may match impedance by using the measured impedance value. Additional information about impedance matching of the control unit will be given with reference to FIGS. 3 to 10.

The second antenna 202 includes the third conductive pattern 153, a second feeding unit 215, a second ground unit 225, and a second feeding matching circuit (T4) 235. The second antenna 202 may transmit and receive a signal of the second frequency band by using the third conductive pattern 153.

The second feeding unit 215 may connect the third conductive pattern 153 with a communication circuit (e.g., an RF circuit, an RF module, or the like) capable of transmitting and receiving an RF signal. The second feeding unit 215 may be a point at which RF power for an operation of the second antenna 202 is supplied. The second feeding unit 215 may be directly connected to the third conductive pattern 153 or may be connected to the third conductive pattern 153 through the second feeding matching circuit 235. The second ground unit 225 may be connected to the third conductive pattern 153. A frequency band of a signal transmitted and received through the second antenna 202 may be changed according to connection locations of the second feeding unit 215 and the second ground unit 225

The second feeding matching circuit (T4) 235 may be connected in series or in parallel between the second feeding unit 215 and the third conductive pattern 153. The second feeding matching circuit 235 may be disposed in an area 262 that is adjacent to the second feeding unit 215. Impedance matching of the second antenna 202 may be made through the second feeding matching circuit 235 without a separate pattern matching circuit.

Referring to FIG. 2B, a third antenna 203 may having a configuration that is similar to the first antenna 201 of FIG. 2A. However, unlike the first antenna 201, the third antenna 203 may be implemented such that the second pattern matching circuit (T3) 245 is not directly connected to the first conductive pattern 151, but is instead connected to a feeding line 230a through a line 245a. Even in the case where the second pattern matching circuit 245 is connected to the feeding line 230a, the second pattern matching circuit 245 may be disposed in the field area 270 adjacent to the first conductive pattern 151.

Figure 3A:
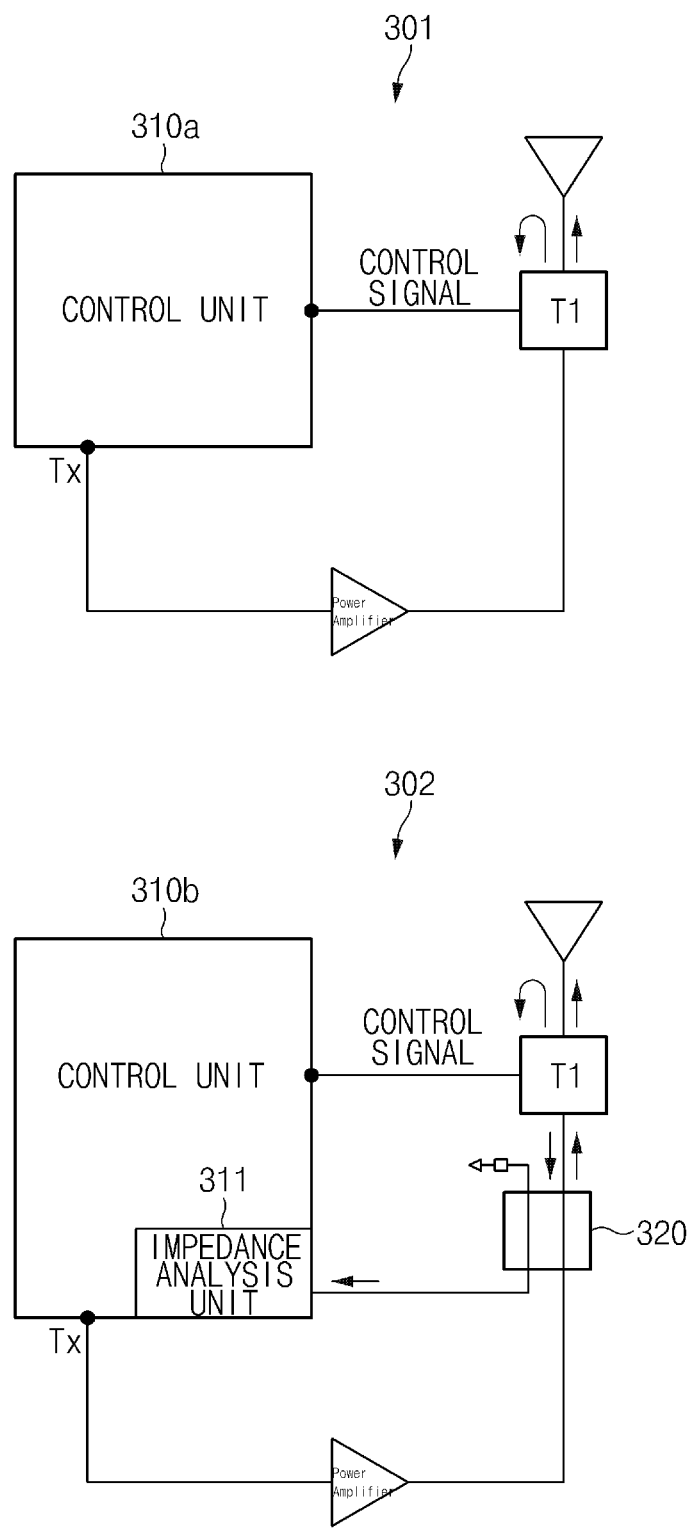
FIGS. 3A and 3B illustrate a plurality of modes determined according to an object in the vicinity of an electronic device, according to an embodiment of the present disclosure.
Figure 3B:
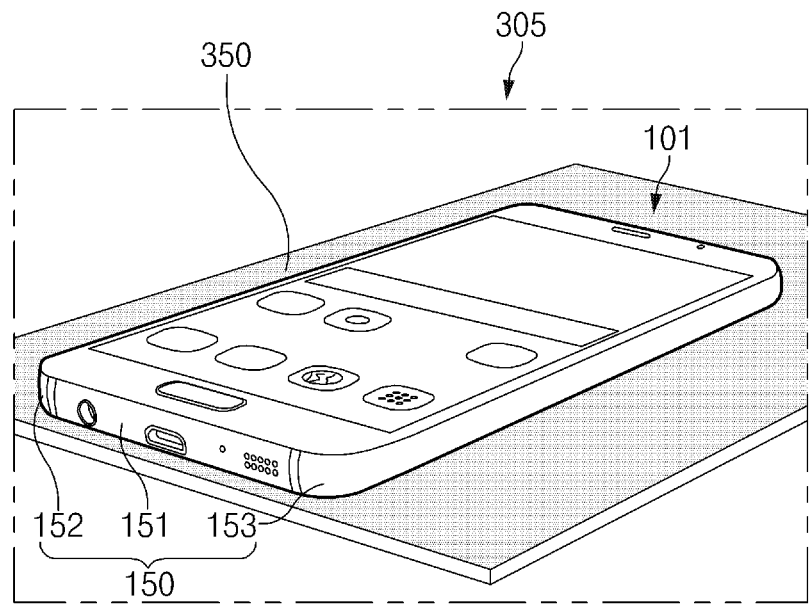
Figure 3B:
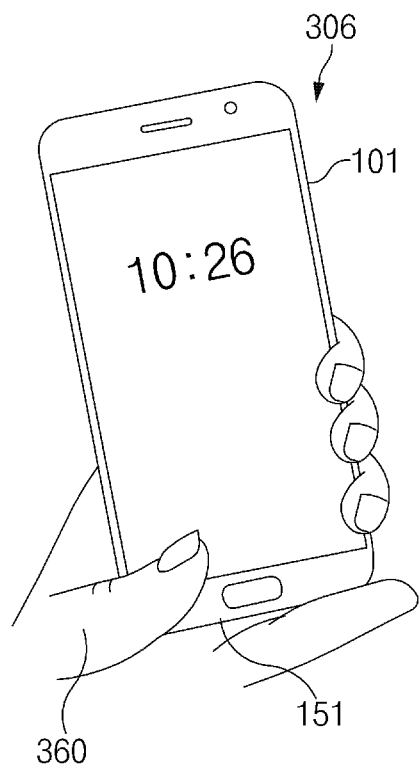

FIGS. 3A and 3B illustrate a plurality of modes determined according to an object in the vicinity of an electronic device, according to an embodiment of the present disclosure.

Referring to FIG. 3A, an example is provided for describing how a matching circuit using an open-loop circuit and a closed-loop circuit is controlled. In FIG. 3A, a circuit diagram 301 and a circuit diagram 302 are provided. The circuit diagram 301 indicates a control of a matching device using an open-loop circuit. A control unit 310a (e.g., a CP) may generate a control signal for controlling a variable element (e.g., a variable capacitor) of a matching circuit (e.g., the feeding matching circuit T1). The control unit 310a may generate the control signal depending on a control scheme that is set under the condition that an object causing an impedance change is absent from the vicinity of the electronic device 101 (a free state), regardless of an input change of an antenna due to a change in a radiation environment. For example, the control unit 310a may generate different control signals with respect to the first frequency band (e.g., long term evolution (LTE) B5) and the second frequency band (e.g., LTE B8) such that a value of a variable element (e.g., a variable capacitor) changes.

The circuit diagram 302 indicates a control of a matching device using a closed-loop circuit. A control unit 310b (e.g., a CP) may generate a control signal for controlling a variable element (e.g., a variable capacitor) of a matching circuit (e.g., the feeding matching circuit T1). The control unit 310b may dynamically control a matching circuit based on an input change of an antenna due to a change of a radiation environment.

An impedance measurement unit 320 may provide an impedance analysis unit 311 of the control unit 310b with a reflected signal, which is generated due to impedance mismatching, of a signal transmitted to an antenna. The impedance analysis unit 311 may detect a magnitude and a phase of the reflected signal provided from the impedance measurement unit 320 to extract input impedance.

In the case where there is no difference between a value of the extracted impedance and an impedance value corresponding to the condition that an object causing an impedance change is absent from the vicinity of the electronic device 101 (a free state), the control unit 310b may generate a control signal for controlling a variable element depending on the determined control scheme.

In the case where the extracted impedance has a value different from the impedance value of the free state, the control unit 310b may determine a mode on the basis of the value of the measured input impedance and may control the matching circuit depending on a scheme corresponding to each mode such that the input impedance is set to a matching state.

Referring to FIG. 3B, an example is provided for describing a plurality of modes determined according to an object in the vicinity of an electronic device.

The case where the electronic device 101 performs impedance matching in two modes will be described. However, embodiments of the present disclosure may not be limited thereto. For example, the electronic device 101 may perform impedance matching in three or more modes.

In FIG. 3B, the control unit 310b of the electronic device 101 may determine an impedance matching scheme based on an impedance value measured in an impedance area (e.g., a line adjacent to a feeding unit). For example, the control unit 310b may analyze input impedance by using an impedance measurement unit (e.g., a directional-coupler (DP)) placed at an input terminal of the feeding unit.

The control unit 310b may distinguish from a first mode, i.e., a steady mode 305 in which an impedance change is relatively small depending on a location on a Smith chart or a movement degree of a resonant frequency or a second mode, i.e., a dynamic mode 306 in which an impedance change is relatively large depending on the location on the Smith chart or the movement degree of the resonant frequency, on the basis of the measured impedance value and may change an impedance matching scheme depending on each mode.

The steady mode 305 may correspond to a radiation environment in which a change in a resonant frequency and radiation efficiency due to an object 350 in the vicinity of the metal frame 150 of the electronic device 101 operating as an antenna radiator is relatively small. For example, the steady mode 305 may correspond to a state in which the electronic device 101 is placed on a table or a floor surface, a state in which a cover accessory is mounted, or the like.

In the case where the electronic device 101 is in the steady mode 305, the control unit 310b may match impedance by using a feeding matching circuit (e.g., T1 or T4 of FIG. 2A or 2B) disposed in the impedance area.

The dynamic mode 306 may correspond to a radiation environment in which a change in a resonant frequency and radiation efficiency due to an object in the vicinity of the metal frame 150 of the electronic device 101 operating as an antenna radiator is relatively large. For example, the dynamic mode 306 may correspond to the case where a body part (e.g., a hand or a head) of a user 360 makes contact with the metal frame 150 of the electronic device 101.

In the case where the electronic device 101 is in the dynamic mode 306, the control unit 310b may match impedance by using a pattern matching circuit (e.g., T2 or T3 of FIG. 2A or 2B) disposed in the field area, as well as the feeding matching circuit (e.g., T1 or T4 of FIG. 2A or 2B) disposed in the impedance area. The control unit 310b may match impedance by controlling a variable element included in the feeding matching circuit or the pattern matching circuit depending on the closed-loop scheme. The closed-loop scheme indicates the following processing: the impedance measurement unit 320 measures a reflected signal, which is generated due to impedance mismatching, of a signal transmitted to an antenna, and provides the reflected signal to the impedance analysis unit 311, then, the impedance analysis unit 311 detects a magnitude and a phase of the reflected signal provided from the impedance measurement unit 320 to extract input impedance, and the control unit 310b controls a variable element in the matching circuit (i.e., at least one of the feeding matching circuit and the pattern matching circuit) such that the input impedance is set to a matching state, based on a result of a comparison between the a value of the extracted input impedance and an impedance value corresponding to the condition that an object causing an impedance change is absent from the vicinity of the electronic device 101 (a free state).

The control unit 310b may have a control code for impedance matching, which is associated with each of the steady mode 305 and the dynamic mode 306. The control unit 310b may control the variable element included in the feeding matching circuit or the pattern matching circuit with the control code, depending on the measured impedance value. The control unit 310b may control all variable elements with a control code that is determined according to an input impedance value on the Smith chart. For example, the control unit may control a variable element adjacent to antenna allocated to communication, as well as a variable element of the antenna allocated for communication.

Figure 4:
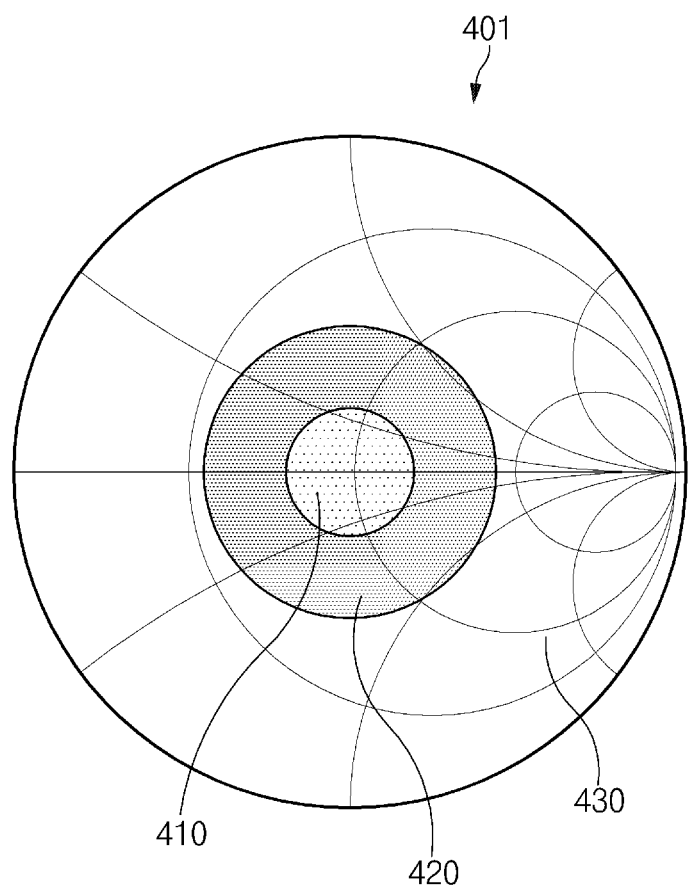
FIG. 4 illustrates a method of classifying radiation modes by using a Smith chart, according to an embodiment of the present disclosure.

FIG. 4 illustrates a method of classifying radiation modes by using a Smith chart, according to an embodiment of the present disclosure.

Referring to FIG. 4, a Smith chart 401 is provided. The Smith chart 401 is divided into circular areas. The control unit 310b may determine a mode for impedance matching based on a location on a Smith chart 401, which corresponds to a measured impedance value. The Smith chart 401 includes a matching area 410, a steady mode area 420, and a dynamic mode area 430.

The matching area 410 may refer to a circular area including a central point at which impedance is matched. The control unit 310b may deactivate a feeding matching circuit (e.g., T1 or T4 of FIG. 2A or 2B) or a pattern matching circuit (e.g., T2 or T3 of FIG. 2A or 2B), in the matching area 410.

The steady mode area 420 may refer to an outer area surrounding the matching area 410. The steady mode area 420 may refer to an area in which a change in a resonant frequency and radiation efficiency due to an object in the vicinity of the electronic device 101 is relatively small. For example, the steady mode area 420 may be an area corresponding to an impedance value measured in a state where the electronic device 101 is placed on a table or a floor surface, in a state where a cover accessory is mounted, or the like.

The control unit 310b may perform impedance matching by using the feeding matching circuit (e.g., T1 or T4 of FIG. 2A or 2B), in the steady mode area 420. The control unit 310b may match impedance by controlling a variable element included in the feeding matching circuit through control of the closed-loop scheme.

The dynamic mode area 430 may refer to the remaining area surrounding the steady mode area 420. The dynamic mode area 430 may refer to an area in which a change in a resonant frequency and radiation efficiency due to an object in the vicinity of the electronic device 101 is relatively large (a state in which the user grips a metal frame).

The control unit may perform impedance matching by using the feeding matching circuit (e.g., T1 or T4 of FIG. 2A or 2B) and the pattern matching circuit (e.g., T2 or T3 of FIG. 2A or 2B), in the dynamic mode area 430. The control unit 310b may match impedance by controlling a variable element included in the feeding matching circuit or the pattern matching circuit through control of the closed-loop scheme.

Figure 5:
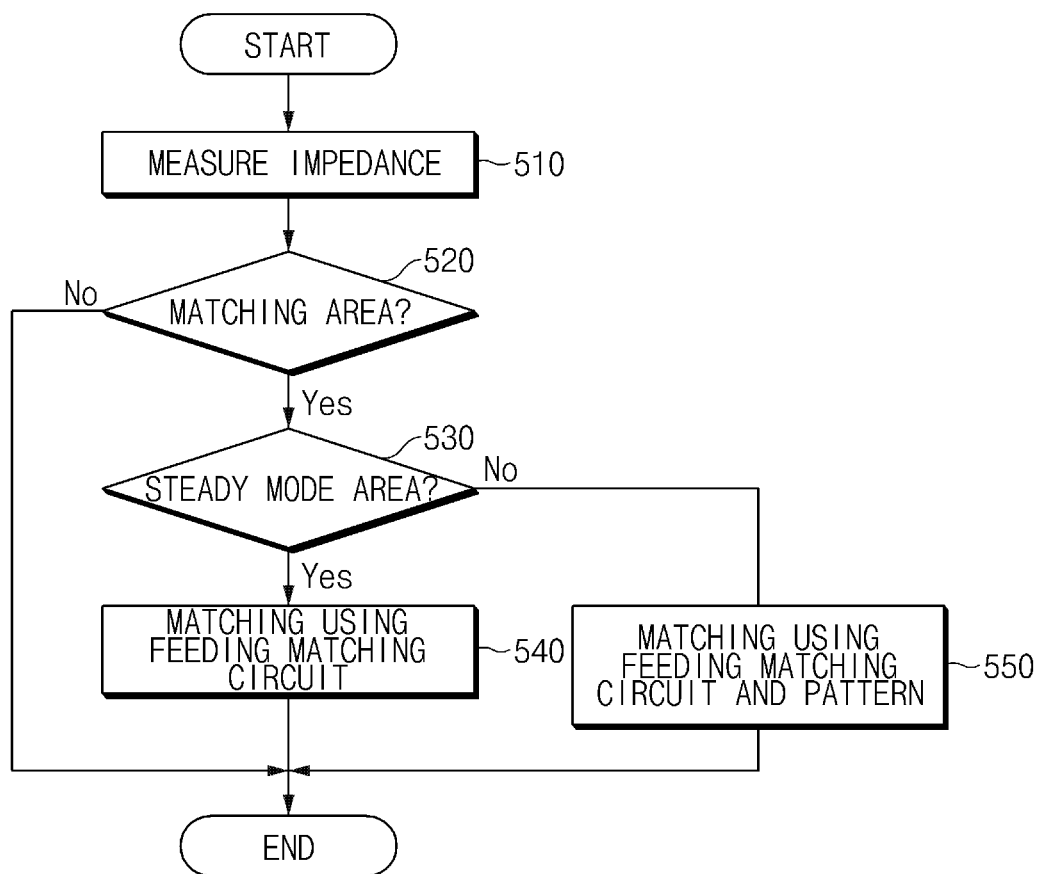
FIG. 5 is a flowchart of a method of a mode change for impedance matching, according to an embodiment of the present disclosure.

FIG. 5 is a flowchart of a method of a mode change for impedance matching, according to an embodiment of the present disclosure.

Referring to FIG. 5, a method of a mode change for impedance matching is provided.

In step 510, a control unit 310b of the electronic device 101 receives an impedance value (or a signal for calculating input impedance, hereinafter the same) measured in the impedance area (e.g., a line adjacent to a feeding unit). The control unit 310b may receive a reflected signal, which is generated due to impedance mismatching, of a signal transmitted to an antenna, from an impedance measurement unit (e.g., a DP) located at an input terminal of the feeding unit.

In step 520, the control unit 310b verifies whether the measured impedance corresponds to the matching area 410. If it is determined that the measured impedance corresponds to the matching area 410, the control unit 310b may end the impedance matching or may monitor an impedance value continuously or periodically to perform an additional matching operation.

In step 530, the control unit 310b may verify whether the measured impedance corresponds to the steady mode area 420. The steady mode area 420 may refer to an outer area surrounding the matching area 410.

If it is determined that the measured impedance corresponds to the steady mode area 420, then in step 540, the control unit 310b controls a feeding matching circuit (e.g., T1 or T4 of FIG. 2A or 2B) to match impedance. The control unit 310b may gradually shift the input impedance to the matching area 410 from the steady mode area 420 depending on the closed-loop scheme.

In the case where the measured impedance is included in the dynamic mode area 430, then in step 550, the control unit 310b controls the feeding matching circuit (e.g., T1 or T4 of FIG. 2A or 2B) and the pattern matching circuit (e.g., T2 or T3 of FIG. 2A or 2B) to match impedance. Depending on the closed-loop scheme, the control unit may shift the input impedance from the steady mode area 420 to the matching area 410 after gradually shifting the input impedance from the dynamic mode area 430 to the steady mode area 420.

For example, the control unit 310b may control the pattern matching circuit (e.g., T2 or T3 of FIG. 2A or 2B) to shift the input impedance from the dynamic mode area 430 to the steady mode area 420 and may shift the input impedance from the steady mode area 420 to the matching area 410 by using the feeding matching circuit (e.g., T1 or T4 of FIG. 2A or 2B).

Figure 6A:
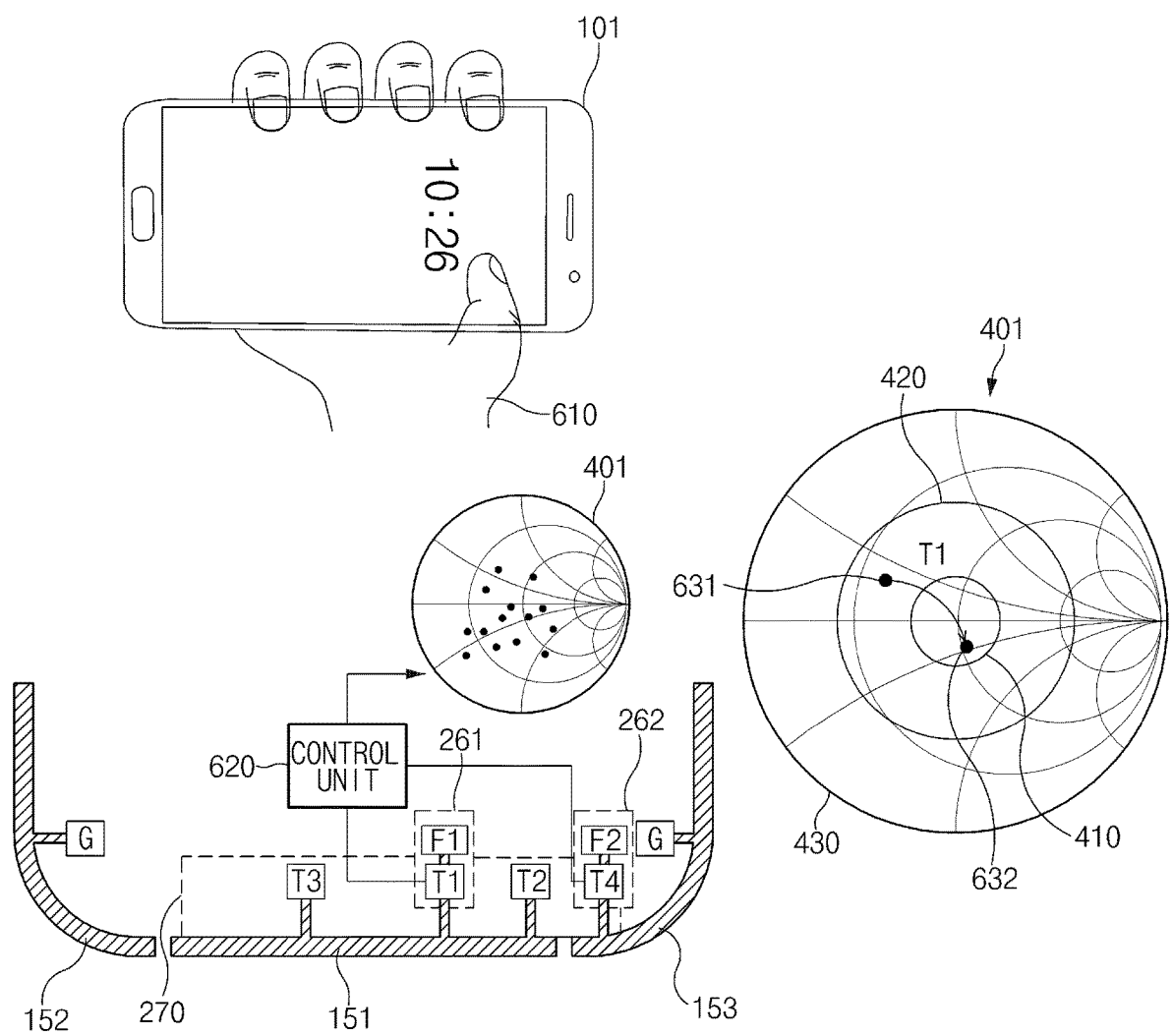
FIG. 6A illustrates an impedance matching process in a steady mode, according to an embodiment of the present disclosure.

FIG. 6A illustrates an impedance matching process in a steady mode, according to an embodiment of the present disclosure.

Referring to FIG. 6A, the steady mode 305 may correspond to a radiation environment in which a change in a resonant frequency and a radiation efficiency due to an object in the vicinity of the first to third conductive patterns 151 to 153 operating as an antenna radiator is relatively small. For example, the steady mode 305 may correspond to a state in which a user 610 does not make direct contact with the first to third conductive patterns 151 to 153 while the user 610 grips a central portion of the electronic device 101. The steady mode 305 may correspond to a state in which measured impedance is included in the steady mode area 420 of the Smith chart 401.

In the case where the measured impedance is included in the steady mode area 420, a control unit 620 may control the feeding matching circuit T1 or T4 of the impedance area to match impedance. The control unit 620 may gradually shift input impedance from the steady mode area 420 to the matching area 410 in the closed-loop scheme.

For example, in the case where firstly measured impedance corresponds to a first point 631 of the steady mode area 420, the control unit 620 may shift impedance to a second point 632 in the matching area 410 by using the first feeding matching circuit T1. The control unit 620 may store a control code associated with the steady mode 305 and may control variable elements (e.g., variable capacitors) included in the feeding matching circuits T1 or T4 by using the stored control code.

Figure 6B:
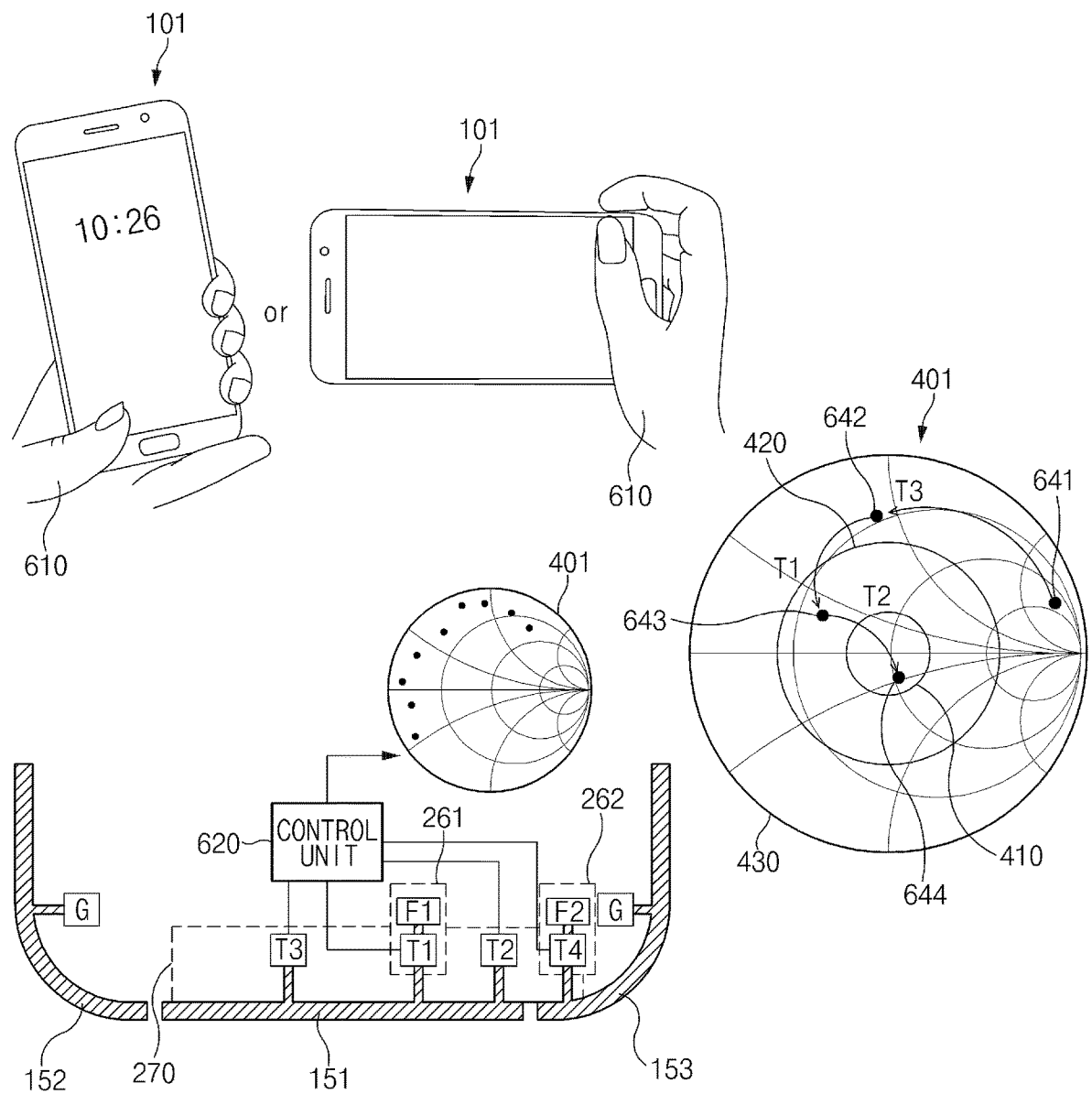
FIG. 6B illustrates an impedance matching process in a dynamic mode, according to an embodiment of the present disclosure.

FIG. 6B illustrates an impedance matching process in a dynamic mode, according to an embodiment of the present disclosure.

Referring to FIG. 6B, the dynamic mode 306 may correspond to a radiation environment in which a change in a resonant frequency and a radiation efficiency due to an object in the vicinity of the first to third conductive patterns 151 to 153 operating as an antenna radiator is relatively large. For example, the dynamic mode 306 may correspond to a state in which the user 610 makes direct contact with the first to third conductive patterns 151 to 153 of the electronic device 101. The dynamic mode 306 may correspond to a state in which measured impedance is included in the dynamic mode area 430 of the Smith chart 401.

In the case where the measured impedance is included in the dynamic mode area 430, the control unit 620 may control both the feeding matching circuit T1 or T4 of the impedance area and the pattern matching circuits T2 or T3 of the field area to match impedance. The control unit 620 may gradually shift the input impedance in the closed-loop scheme from the dynamic mode area 430 to the steady mode area 420 and again from the steady mode area 420 to the matching area 410.

For example, in the case where firstly measured impedance corresponds to a first point 641 of the dynamic mode area 430, the control unit 620 may shift impedance to a second point 642 by using the first pattern matching circuit T3. The control unit 620 may shift impedance from the second point 642 to a third point 643 of the steady mode area 420 by using the first feeding matching circuit T1. The control unit 620 may shift impedance from the third point 643 of the steady mode area 420 to a fourth point 644 of the matching area 410 by using the second feeding matching circuit T2. The control unit 620 may in advance store a control code associated with the dynamic mode 306 and may control variable elements (e.g., variable capacitors) included in the feeding matching circuits (T1 or T4) or the pattern matching circuits (T2 or T3) by using the stored control code.

Figure 7A:
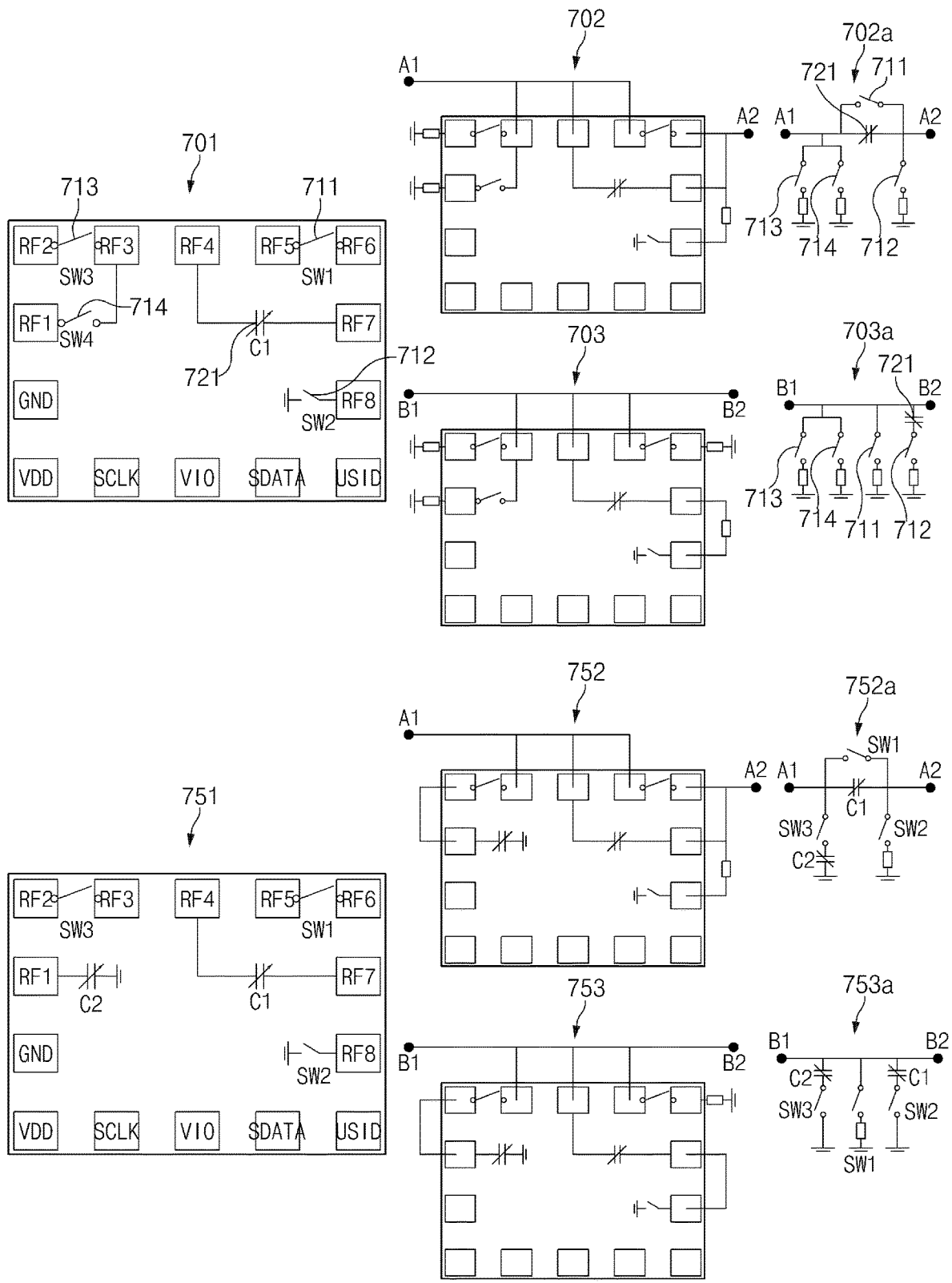
FIG. 7A illustrates a configuration of a feeding matching circuit or a pattern matching circuit using one chip, according to an embodiment of the present disclosure.

FIG. 7A illustrates a configuration of a feeding matching circuit or a pattern matching circuit using one chip, according to an embodiment of the present disclosure.

Referring to FIG. 7A, a chip 701 included in a circuit diagram 702 and a circuit diagram 703, and a chip 751 included in a circuit diagram 752 and a circuit diagram 753 are provided. The chip 701 includes first to fourth switches 711 to 714 and one variable capacitor 721. The elements may be connected to RF1 to RF8 terminals. The first switch 711 may be connected between RF5 and RF6, and the second switch 712 may be connected between RF8 and a ground. The third switch 713 may be connected between RF2 and RF3, and the fourth switch 714 may be connected between RF1 and RF3. The variable capacitor 721 may be connected between RF4 and RF7.

In the circuit diagram 702, the chip 701 may be used as a feeding matching circuit (e.g., T1 or T4 of FIG. 2A or 2B or FIG. 6A or 6B) in the impedance area around the feeding unit. In this case, each of RF1 and RF2 may be connected to the ground. RF3 to RF5 may be connected to the feeding unit through a first end A1, and RF6 to RF8 may be connected to a conductive pattern used as an antenna radiator through a second end A2 (connected in series between A1 and A2).

In an equivalent circuit diagram 702a, the variable capacitor 721 may be connected in series between A1 and A2, and the first switch 711 may be connected to opposite ends of the variable capacitor 721. The second switch 712 may be connected to the ground at a point adjacent to A2, and the third and fourth switches 713 and 714 may be connected to the ground at a point adjacent to A1.

In the circuit diagram 703, the chip 701 may be used as a pattern matching circuit (e.g., T2 or T3 of FIG. 2A or 2B or FIG. 6A or 6B) in the field area in the vicinity of the conductive pattern. In this case, each of RF1, RF2, and RF6 may be connected to the ground. RF3 to RF5 may be connected in parallel between B1 and B2, which is part of a conductive pattern, and RF7 and RF8 may be connected to each other.

In an equivalent circuit diagram 703a, the variable capacitor 721 may be connected in parallel with a conductive line between B1 and B2 through the second switch 712, and the second switch 712 may be connected between the variable capacitor 721 and the ground. Each of the first switch 711, the third switch 713, and the fourth switch 714 may be connected in parallel between B1 and B2, which is part of a conductive pattern.

The chip 751 includes first to third switches SW1 to SW3 and two variable capacitors C1 and C2. The elements may be connected to RF1 to RF8 terminals. The first switch SW1 may be connected between RF5 and RF6, and the second switch SW2 may be connected between RF8 and a ground. The third switch SW3 may be connected between RF2 and RF3. The first variable capacitor C1 may be connected between RF4 and RF7, and the second variable capacitor C2 may be connected between RF1 and the ground.

In the circuit diagram 752, the chip 751 may be used as a feeding matching circuit (e.g., T1 or T4 of FIG. 2A or 2B or FIG. 6A or 6B) in the impedance area around the feeding unit. In this case, RF1 and RF2 may be connected to each other. RF3 to RF5 may be connected to the feeding unit through the first end A1, and RF6 to RF8 may be connected to a conductive pattern used as an antenna radiator through the second end A2.

In an equivalent circuit diagram 752a, the first variable capacitor C1 may be connected in series between A1 and A2, and the first switch SW1 may be connected to opposite ends of the first variable capacitor C1. The second switch SW2 may be connected between A2 and the ground, and the third switch SW3 may be connected between A1 and the ground. The second variable capacitor C2 may be connected between A1 and the ground through the third switch SW3.

In the circuit diagram 753, the chip 751 may be used as a pattern matching circuit (e.g., T2 or T3 of FIG. 2A or 2B or FIG. 6A or 6B) in the field area in the vicinity of the conductive pattern. In this case, RF1 and RF2 may be connected to each other, and RF6 may be connected to the ground. Each of RF3 to RF5 may be connected with part of a conductive pattern (between B1 and B2), and RF7 and RF8 may be connected to each other.

In an equivalent circuit diagram 753a, the first switch SW1 may be connected between a conductive line between B1 and B2 and the ground. The first variable capacitor C1 may be connected between a conductive line between B1 and B2 and the ground through the second switch SW2, and the second variable capacitor C2 may be connected between the conductive line between B1 and B2 and the ground through the third switch SW3.

Figure 7B:
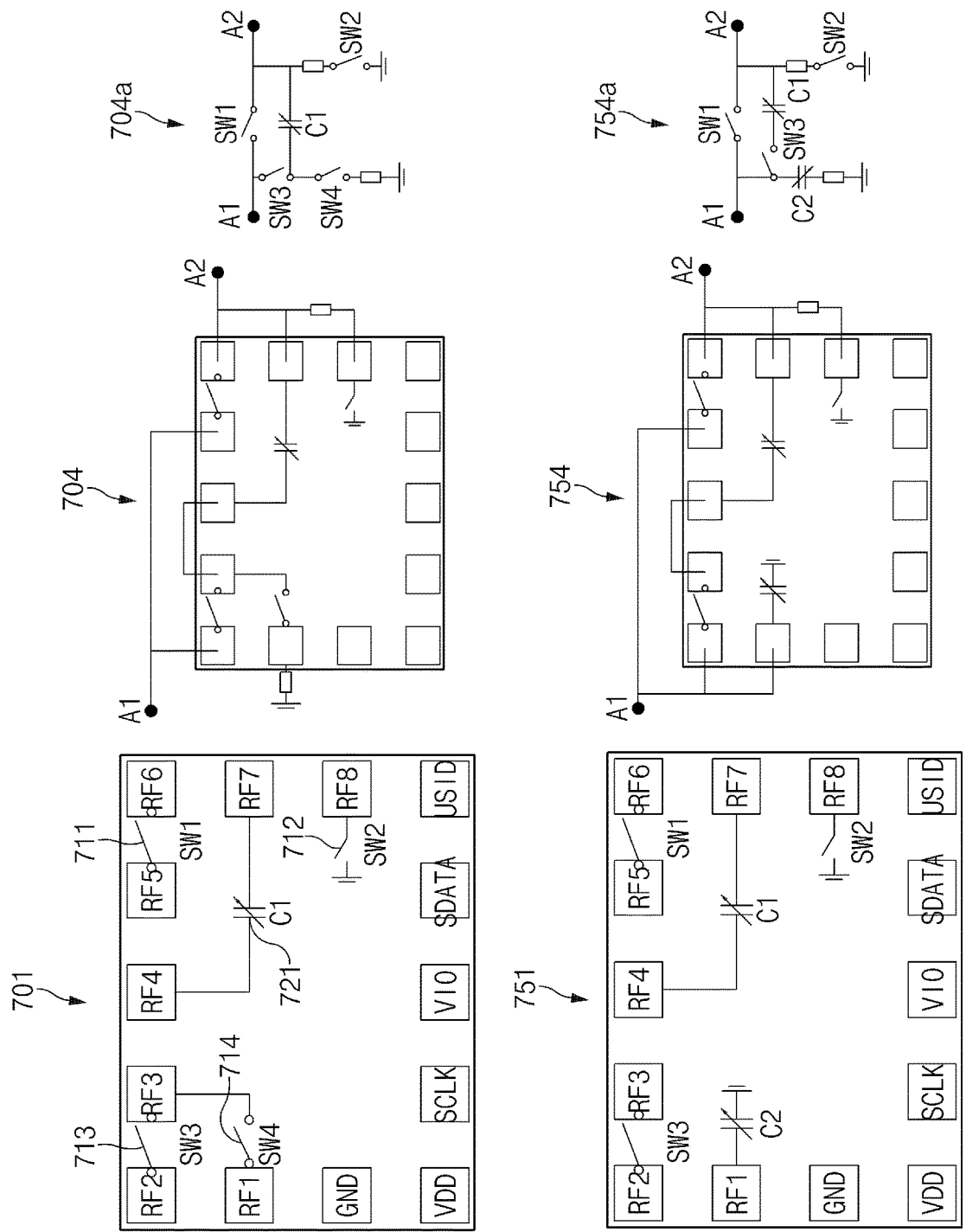
FIG. 7B illustrates a configuration of a feeding matching circuit, according to an embodiment of the present disclosure.

FIG. 7B illustrates a configuration of a feeding matching circuit, according to an embodiment of the present disclosure.

Referring to FIG. 7B, the chip 701 included in a circuit diagram 704 and the chip 751 included in a circuit diagram 754 are provided. The chip 701 includes first to fourth switches SW1 to SW4 and one variable capacitor C1. The elements may be connected to RF1 to RF8 terminals of the chip 701. For example, the first switch SW1 may be connected between RF5 and RF6. The second switch SW2 may be connected between RF8 and the ground. The third switch SW3 may be connected between RF2 and RF3. The fourth switch SW4 may be connected between RF1 and RF3. The variable capacitor C1 may be connected between RF4 and RF7.

In the circuit diagram 704, the chip 701 may be used as a feeding matching circuit (e.g., T1 or T4 of FIG. 2A or 2B or FIG. 6A or 6B) in an impedance area around a feeding unit. In this case, RF1 may be connected to the ground. RF2 and RF5 may be connected to the feeding unit through the first end A1. RF3 and RF4 may be connected to each other. RF6 to RF8 may be connected to a conductive pattern used as an antenna radiator through the second end A2.

In an equivalent circuit diagram 704a, the variable capacitor C1 may be connected to the first end A1 through the third switch SW3 and may be directly connected to the second end A2 without a separate switch. It may be possible to reduce influence of the variable capacitor C1 through the third switch SW3. The second switch SW2 may be connected to the ground at a point adjacent to A2, and the fourth switch SW4 may be connected to the ground at a point adjacent to A1.

The feeding matching circuit (e.g., T1 or T4 of FIG. 2A or 2B or FIG. 6A or 6B) using the equivalent circuit diagram 704a may have a variable element (e.g., the variable capacitor C1) that is connected in series between the first end A1 and the second end A2 through a switch (e.g., the third switch SW3). A switch may be disposed in a path between an input and an output of a tuner element, and the tuner element may have a perfect open characteristic in a radio frequency.

The chip 751 includes the first to third switches SW1 to SW3 and the two variable capacitors C1 and C2. The elements may be connected to RF1 to RF8 terminals. The first switch SW1 may be connected between RF5 and RF6. The second switch SW2 may be connected between RF8 and the ground. The third switch SW3 may be connected between RF2 and RF3. The variable capacitor C1 may be connected between RF4 and RF7. The second variable capacitor C2 may be connected between RF1 and the ground.

In the circuit diagram 754, the chip 751 may be used as a feeding matching circuit (e.g., T1 or T4 of FIG. 2A or 2B or FIG. 6A or 6B) in an impedance area around a feeding unit. RF1, RF2, and RF5 may be connected to the feeding unit through the first end A1. RF3 and RF4 may be connected to each other. RF6 to RF8 may be connected to a conductive pattern used as an antenna radiator through the second end A2.

In an equivalent circuit diagram 754*a*, the variable capacitor C1 may be connected to the first end A1 through the third switch SW3 and may be directly connected to the second end A2 without a separate switch. It may be possible to reduce influence of the variable capacitor C1 through the third switch SW3. The second switch SW2 may be connected to the ground at a point adjacent to the second end A2. The variable capacitor C2 may be connected between the first end A1 and the ground.

The feeding matching circuit (e.g., T1 or T4 of FIG. 2A or 2B or FIG. 6A or 6B) using the equivalent circuit diagram 754*a* may have a variable element (e.g., the variable capacitor C1) that is connected in series between the first end A1 and the second end A2 through a switch (e.g., the third switch SW3) and a variable element (e.g., the variable capacitor C2) connected in parallel. A switch may be disposed in a path between an input and an output of a tuner element, and the tuner element may have a perfect open characteristic in a radio frequency.

Figure 7C:
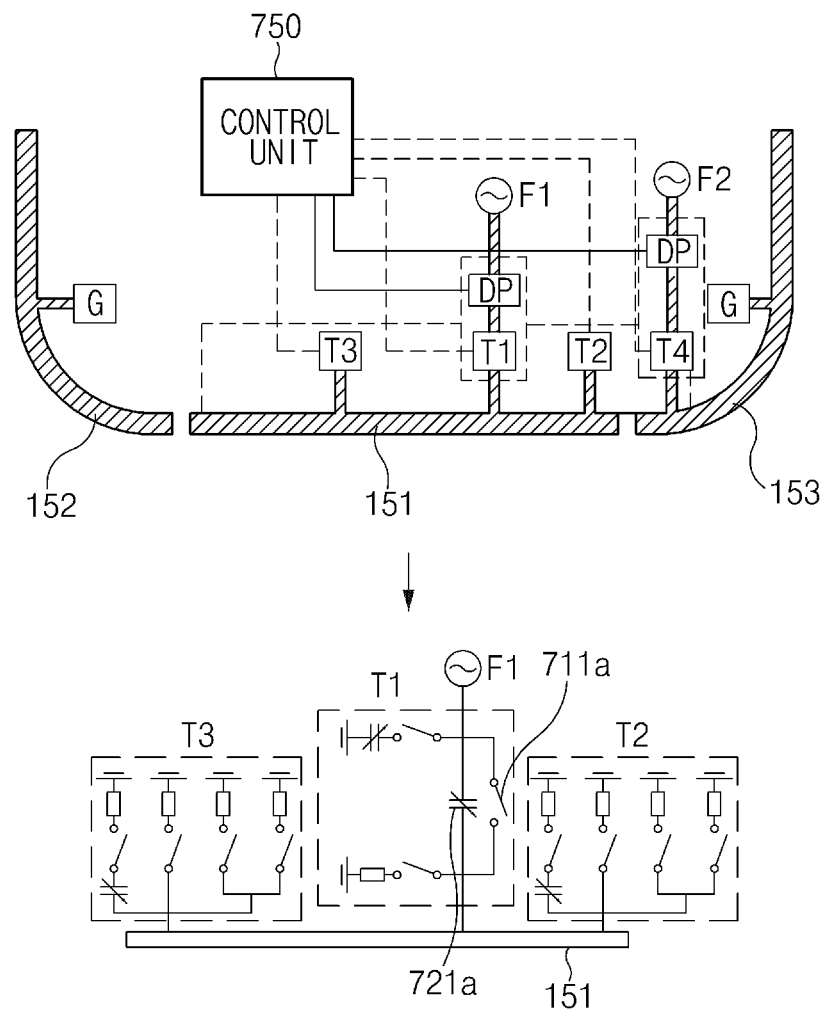
FIG. 7C illustrates an antenna using the chip of FIG. 7A, according to an embodiment of the present disclosure.

FIG. 7C illustrates an antenna using the chip of FIG. 7A, according to an embodiment of the present disclosure. FIG. 7C illustrates the case where the chip 751 is used as the feeding matching circuit and the chip 701 is used as the pattern matching circuit. However, embodiments of the present disclosure are not limited thereto.

Referring to FIG. 7C, the first feeding matching circuit T1 may be implemented through the chip 751 of FIG. 7A, and each of the first pattern matching circuit T2 and the second pattern matching circuit T3 may be implemented through the chip 701 of FIG. 7A.

The first feeding matching circuit T1 may be connected in series between the feeding unit F1 and the first conductive pattern 151, and each of the first pattern matching circuit T2 and the second pattern matching circuit T3 may be connected in parallel with the first conductive pattern 151.

Variable capacitors and switches in the first feeding matching circuit T1, the first pattern matching circuit T2, and the second pattern matching circuit T3 may operate according to control signals of the control unit 620. The control unit 620 may determine an impedance matching scheme based on impedance measured using an impedance measurement unit (e.g., a DP) connected to the feeding unit F1 or F2.

Figure 7D:
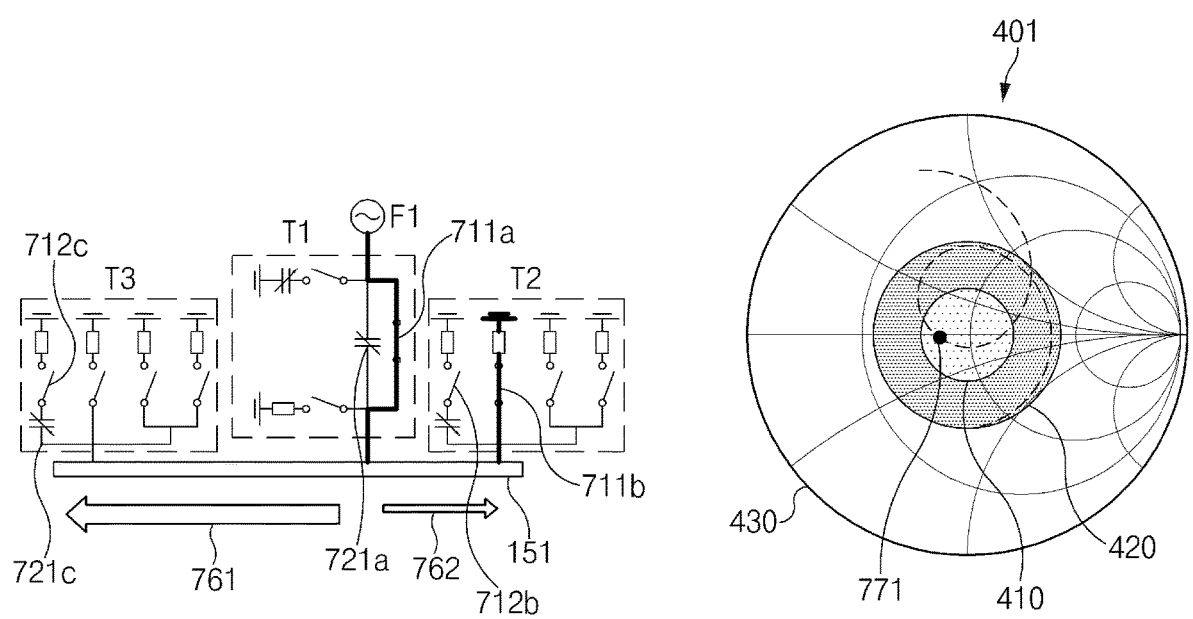
FIGS. 7D to 7F illustrate impedance matching using the antenna of FIG. 7C, according to an embodiment of the present disclosure.
Figure 7E:
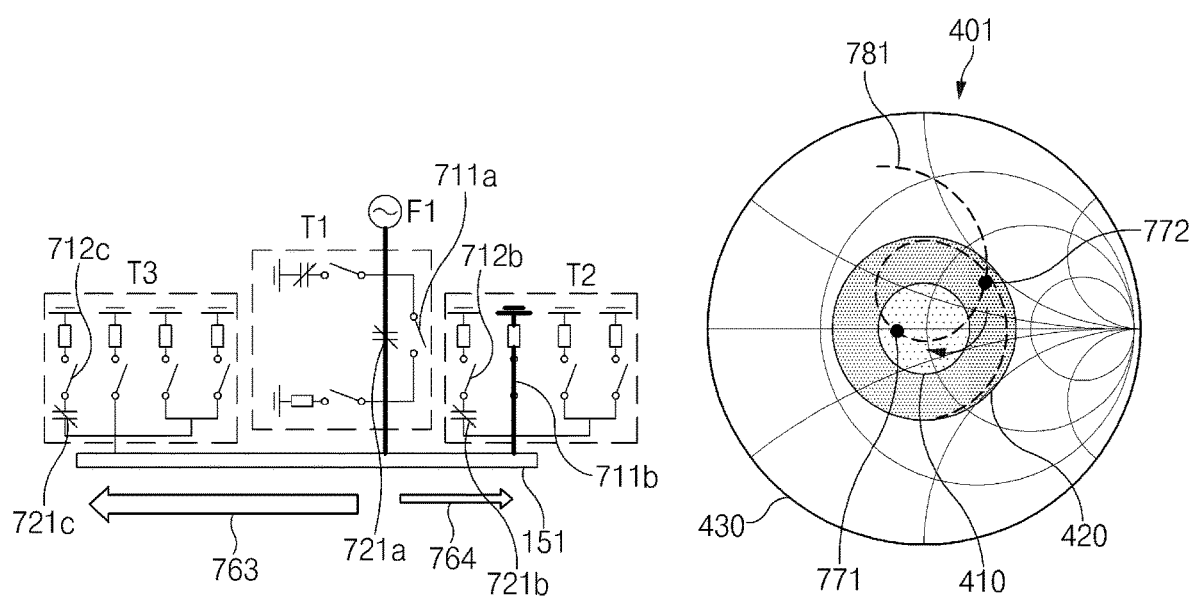
Figure 7F:
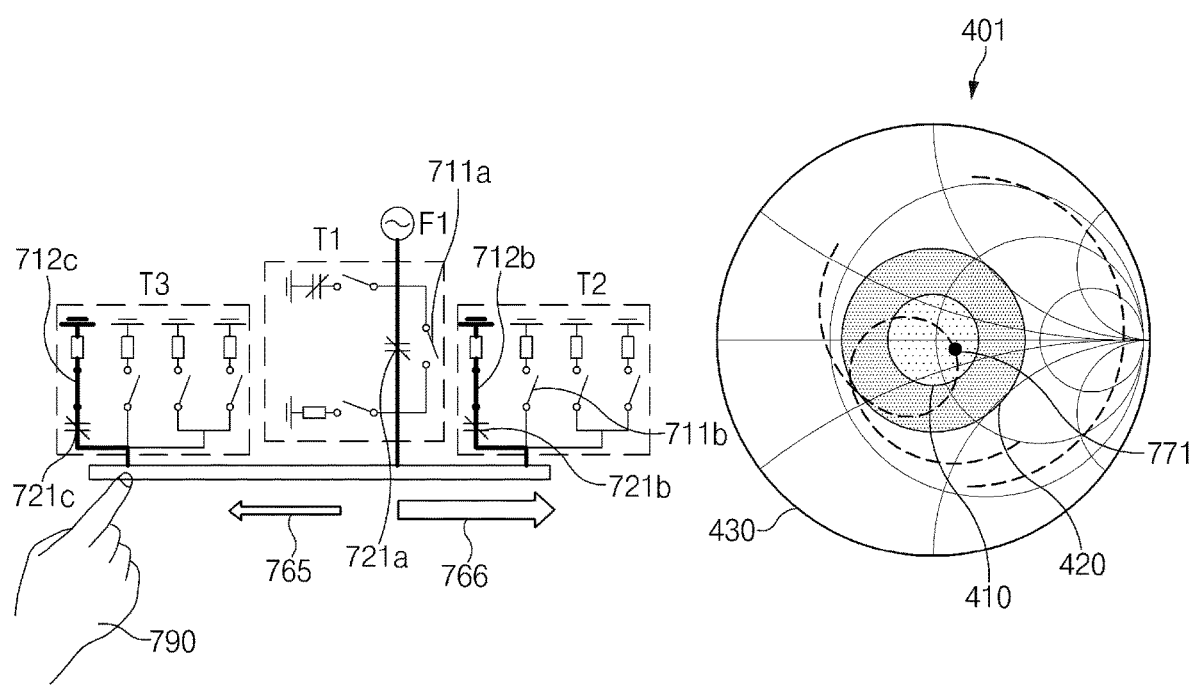

FIGS. 7D to 7F illustrate impedance matching using the antenna of FIG. 7C, according to an embodiment of the present disclosure.

Referring to FIG. 7D, the control unit 620 may be optimized to transmit and receive a signal of a specific frequency band (e.g., B8, 800 MHz) in a state where any other object is absent from the vicinity of the first conductive pattern 151 (the matching mode). For example, in the first feeding matching circuit T1, a switch 711*a* connected in parallel with a variable capacitor 721*a* may be at a short state, and other switches may be at an open state. In the first pattern matching circuit T2, a switch 711*b* connected to a ground is at a short state, and other switches may be at an open state. All switches of the second pattern matching circuit T3 may be in an open state.

For example, Table 1 shows operations of elements in each matching circuit.

TABLE 1

|    | C1   | C2   | SW1 | SW2 | SW3 |
|----|------|------|-----|-----|-----|
| T1 | Cmin | Cmin | ON  | OFF | OFF |
| T2 | Cmin | /    | ON  | OFF | OFF |
| T3 | Cmin | /    | OFF | OFF | OFF |

In this case, a radiation current may mainly flow through a portion, to which the second pattern matching circuit T3 is connected, of the first conductive pattern 151 (a radiation current flow 761), and a relatively small radiation current may flow through the remaining portion, to which the first pattern matching circuit T2 connected to the ground is connected, of the first conductive pattern 151 (a radiation current flow 762).

In the matching mode, an impedance value measured in an impedance area around the first feeding unit F1 may be a value corresponding to a first point 771 in the matching area 410.

Referring to FIG. 7E, in the steady mode (e.g., in the case where a cover having permittivity is mounted in the vicinity of the first conductive pattern 151), an impedance value measured in an impedance area around the feeding unit F1 may be a value corresponding to a second point 772 in the steady mode area 420.

In this case, since only an electrical length is changed without a large shape change of a Smith chart, the control unit 620 may adjust a capacitance (C) value of the variable capacitor 721*a* of the first feeding matching circuit T1 such that an impedance value is shifted to the first point 771 in the matching area 410. States of the first pattern matching circuit T2 and the second pattern matching circuit T3 may be the same as those of FIG. 7D in the matching mode.

For example, the control unit 620 may change the switch 711*a* connected in parallel with the variable capacitor 721*a* from a short state to an open state. The control unit 620 may gradually change the capacitance (C) value of the variable capacitor 721*a* by the closed-loop scheme. In the case where the impedance value is shifted to the first point 771 in the matching area 410, the control unit 620 may maintain the corresponding state.

For example, Table 2 shows operations of elements in each matching circuit.

TABLE 2

|    | C1    | C2   | SW1 | SW2 | SW3 |
|----|-------|------|-----|-----|-----|
| T1 | 16 pF | Cmin | OFF | OFF | OFF |
| T2 | Cmin  | /    | ON  | OFF | OFF |
| T3 | Cmin  | /    | OFF | OFF | OFF |

In the steady mode, as in the radiation current flow of FIG. 7E, a radiation current may mainly flow through a portion, to which the second pattern matching circuit T3 is connected, of the first conductive pattern 151 (a radiation current flow 763), and a relatively small radiation current may flow through the remaining portion, to which the first pattern matching circuit T2 connected to the ground is connected, of the first conductive pattern 151 (a radiation current flow 764).

Referring to FIG. 7F, in the dynamic mode (e.g., a user makes contact with the first conductive pattern 151 through his/her body part 790), input matching loss and radiation drop may be relatively great. In this case, at a hand contact point, formation of a radiation field through the first conductive pattern 151 may be hindered, and a resonance point may not be formed on a Smith chart.

The control unit 620 may allow a resonance point to be formed at the first point 771 in the matching area 410 by using all of the first feeding matching circuit T1, the first pattern matching circuit T2, and the second pattern matching circuit T3. For example, the switch 711a connected in parallel with the variable capacitor 721a may be changed from a short state to an open state. The switch 711b of the first pattern matching circuit T2 may be changed from a short state to an open state. A switch 712b connected to a variable capacitor 721b of the first pattern matching circuit T2 may be changed from an open state to a short state. A switch 712c connected to a variable capacitor 721c of the second pattern matching circuit T3 may be changed from an open state to a short state.

For example, Table 3 shows operations of elements in each matching circuit.

TABLE 3

|  | C1 | C2 | SW1 | SW2 | SW3 |
| --- | --- | --- | --- | --- | --- |
| T1 | 16 pF | Cmin | OFF | OFF | OFF |
| T2 | 3.2 pF | / | OFF | ON | OFF |
| T3 | 16 pF | / | OFF | ON | OFF |

In this case, a radiation current path that is different from that of FIG. 7D (the matching mode) or FIG. 7E (the steady mode) may be formed. A small radiation current may flow through a portion, to which the second pattern matching circuit T3 being in contact with the body part 790 of the user is connected, of the first conductive pattern 151 (a radiation current flow 765), and a radiation current may mainly flow through the remaining portion, to which the first pattern matching circuit T2 is connected, of the first conductive pattern 151 (a radiation current flow 766). The control unit 620 may decrease the amount of a radiation current with respect to a portion of the first conductive pattern 151 adjacent to the body part 790 of the user such that both a matching characteristic and radiation performance are improved.

Figure 7G:
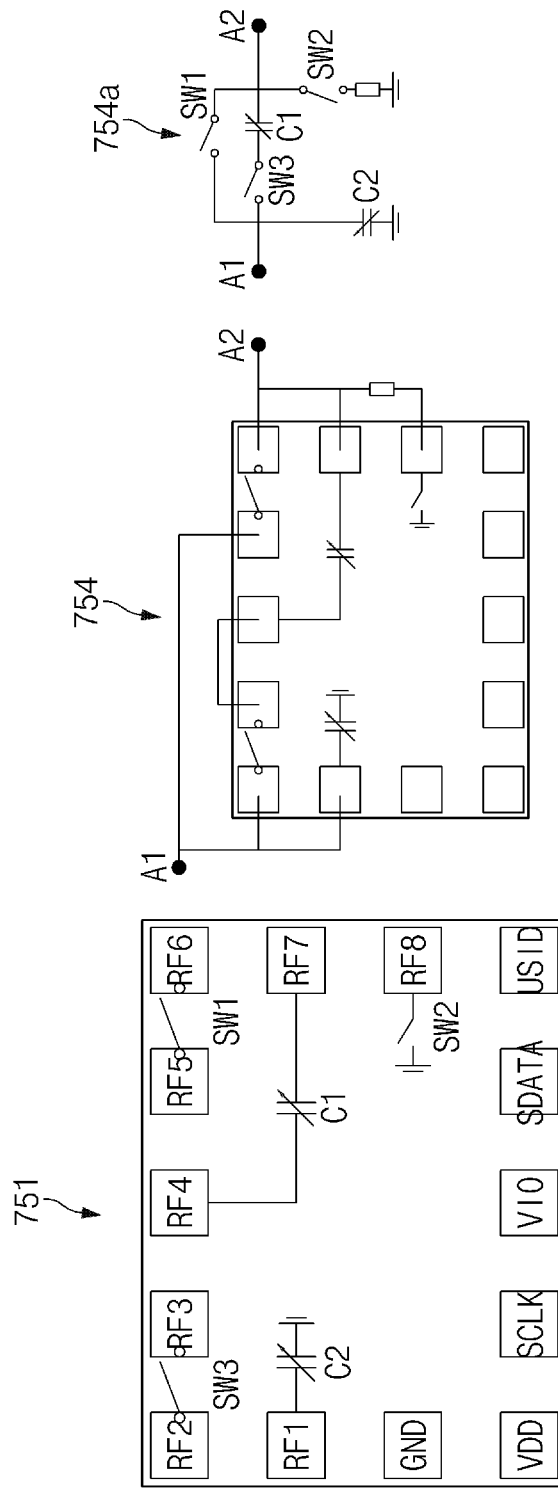
FIG. 7G illustrates a configuration of a feeding matching circuit using one chip, according to an embodiment of the present disclosure.

FIG. 7G illustrates a configuration of a feeding matching circuit using one chip, according to an embodiment of the present disclosure.

Referring to FIG. 7G, the chip 751, the circuit diagram 754, and the equivalent circuit diagram 754a are provided. The chip 751 includes the first to third switches SW1 to SW3 and the two variable capacitors C1 and C2. The elements may be connected to RF1 to RF8 terminals. The first switch SW1 may be connected between RF5 and RF6, and the second switch SW2 may be connected between RF8 and a ground. The third switch SW3 may be connected between RF2 and RF3. The first variable capacitor C1 may be connected between RF4 and RF7, and the second variable capacitor C2 may be connected between RF1 and the ground.

In the circuit diagram 754, the chip 751 may be used as a feeding matching circuit (e.g., T1 or T4 of FIG. 2A or 2B or FIG. 6A or 6B) in an impedance area around a feeding unit. In this case, RF1 and RF2 may be connected to each other. RF3 and RF4 may be connected to each other. RF2 and RF5 may be connected to the feeding unit through the first end A1, and RF6 to RF8 may be connected to a conductive pattern used as an antenna radiator through the second end A2.

In the equivalent circuit diagram 754a, the first switch SW1 may be connected between the first end A1 and the second end A2. Also, the first variable capacitor C1 and the third switch SW3 may be connected in series between the first end A1 and the second end A2. The second switch SW2 may be connected between the second end A2 and the ground, and the second variable capacitor C2 may be connected between the first end A1 and the ground.

Figure 7H:
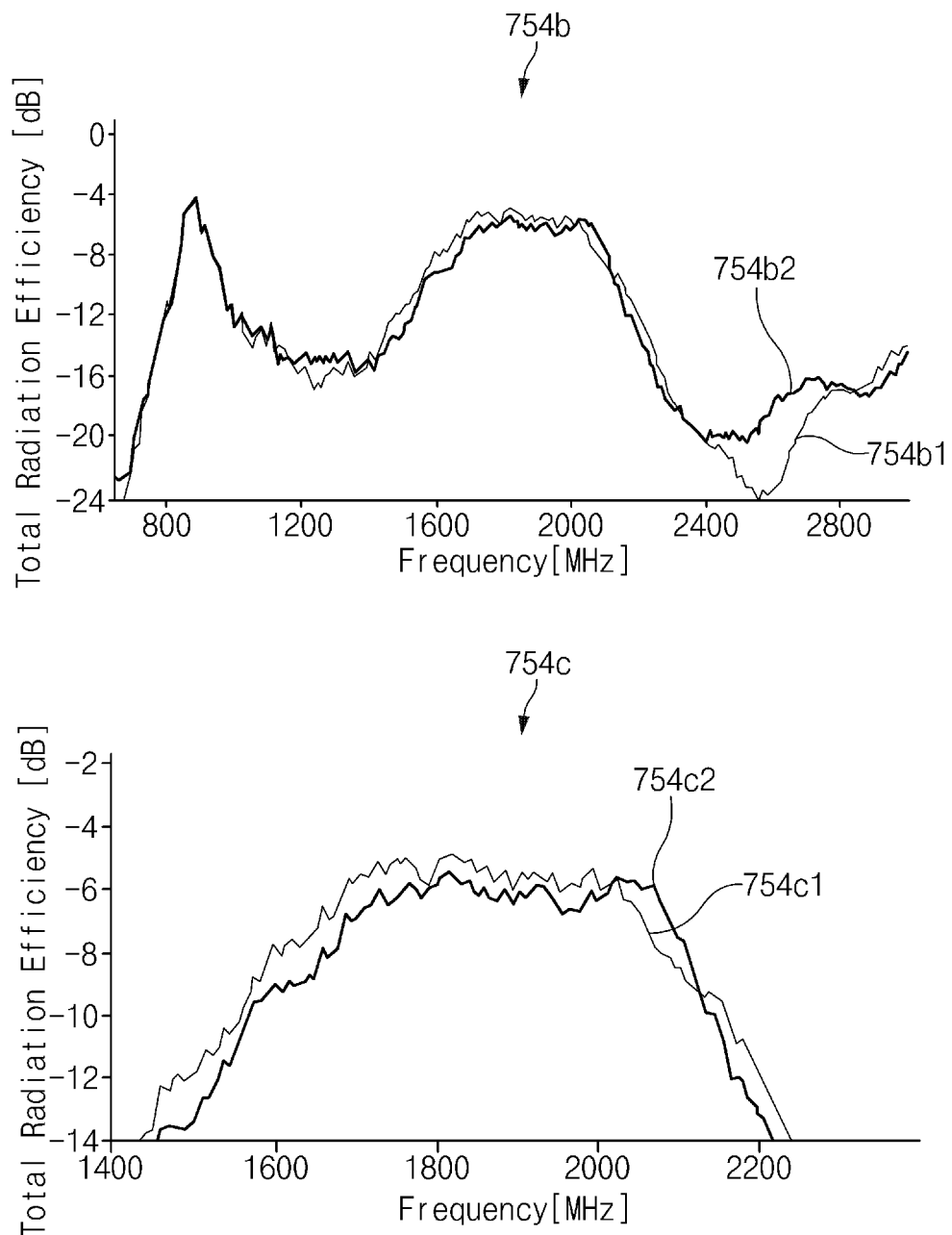
FIG. 7H is a graph indicating a change in communication performance in the case where a feeding matching circuit is implemented by using the chip of FIG. 7G, according to an embodiment of the present disclosure.

FIG. 7H is a graph indicating a change in communication performance in the case where a feeding matching circuit is implemented by using the chip of FIG. 7G, according to an embodiment of the present disclosure.

Referring to FIG. 7H, a graph 754b and 754c are provided. In FIG. 7H, the chip 751 of FIG. 7G may be connected as illustrated in the circuit diagram 754 so as to be used as a feeding matching circuit (e.g., T1 or T4 of FIG. 2A or 2B or FIG. 6A or 6B) in an impedance area around a feeding unit.

In the graph 754b, that communication performance in a high band is improved may be understood from the result of comparing communication performance before the chip 751 is used as a feeding matching circuit (754b1) and communication performance after the chip 751 is used as a feeding matching circuit (754b2). For example, in a 2600 MHz band, the radiation efficiency may increase by about 5 dB.

In the graph 754c, that communication performance in a middle band is improved may be understood from the result of comparing communication performance before the chip 751 is used as a feeding matching circuit (754c1) and communication performance after the chip 751 is used as a feeding matching circuit (754c2). For example, in a 2100 MHz band, the radiation efficiency may increase by about 2 dB.

Figure 8:
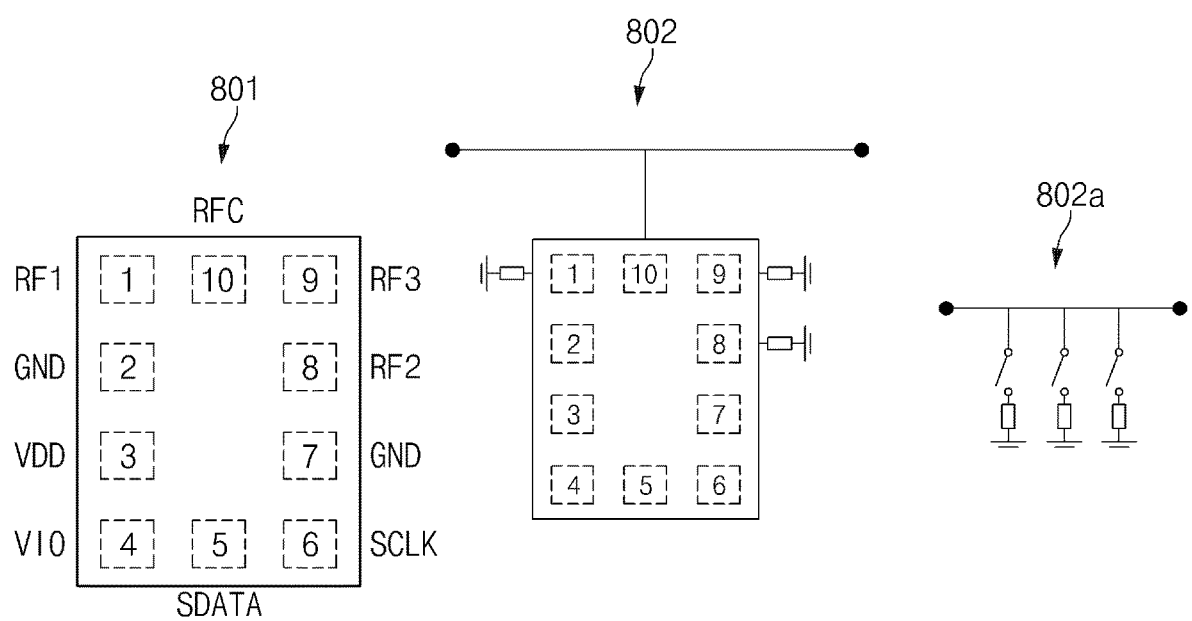
FIG. 8 illustrates a switch structure in a field area, according to an embodiment of the present disclosure.

FIG. 8 illustrates a switch structure in a field area, according to an embodiment of the present disclosure.

Referring to FIG. 8, a chip 801, a circuit diagram 802, and an equivalent circuit diagram 802a are provided. In the chip 801, each of RF1 to RF3 terminals may be connected with an RFC terminal through a corresponding one of the first to third switches. The chip 801 may not include a separate variable element. In the circuit diagram 802, each of RF1 to RF3 may be connected to a ground. In the equivalent circuit diagram 802a, the first to third switches may be connected in parallel between B1 and B2, which is part of a conductive pattern.

The chip 801 may be disposed in a field area in the vicinity of the conductive pattern. The chip 801 may control the first to third switches to perform impedance matching.

Figure 9:
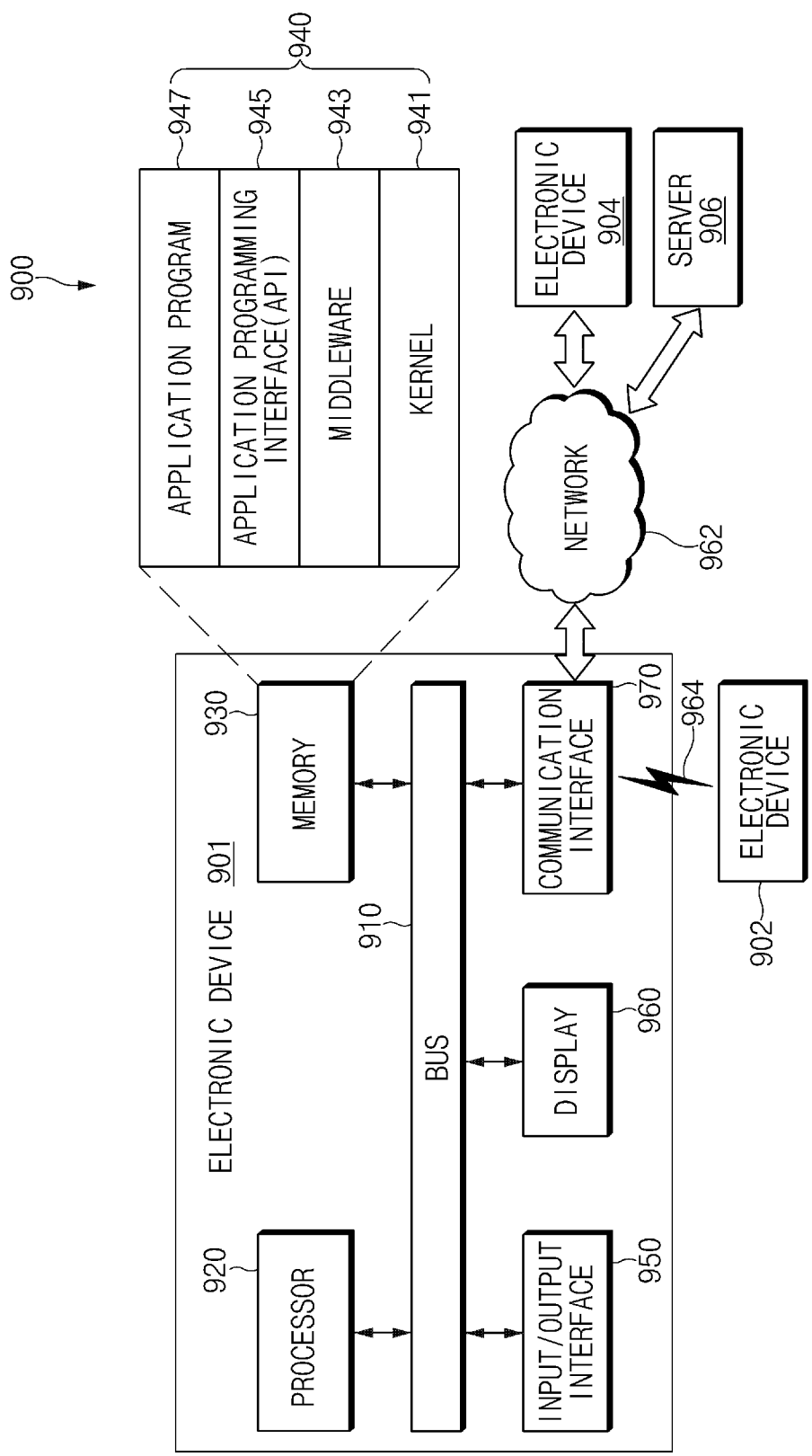
FIG. 9 illustrates an electronic device in a network environment, according to an embodiment of the present disclosure.

FIG. 9 illustrates an electronic device in a network environment, according to an embodiment of the present disclosure.

Referring to FIG. 9, an electronic device 901 in a network environment 900 is provided. The electronic device 901 includes a bus 910, a processor 920, a memory 930, an input/output interface 950, a display 960, and a communication interface 970. At least one of the foregoing elements may be omitted or another element may be added to the electronic device 901.

The bus 910 is a circuit for connecting the above-mentioned elements 910 to 970 to each other and transferring communications (e.g., control messages and/or data) among the above-mentioned elements.

The processor 920 may include at least one of a central processing unit (CPU), an application processor (AP), and a CP. The processor 920 may perform data processing or an operation related to communication and/or control of at least one of the other elements of the electronic device 901.

The memory 930 may include a volatile memory and/or a nonvolatile memory. The memory 930 may store instructions or data related to at least one of the other elements of the electronic device 901. The memory 930 may store software and/or a program 940. The program 940 includes, for example, a kernel 941, a middleware 943, an application programming interface (API) 945, and/or an application program 947. At least a portion of the kernel 941, the middleware 943, or the API 945 may be referred to as an operating system (OS).

The kernel 941 may control or manage system resources (e.g., the bus 910, the processor 920, the memory 930, or the like) used to perform operations or functions of other programs (e.g., the middleware 943, the API 945, or the application program 947). Furthermore, the kernel 941 may provide an interface for allowing the middleware 943, the API 945, or the application program 947 to access individual elements of the electronic device 901 in order to control or manage the system resources.

The middleware 943 may serve as an intermediary so that the API 945 or the application program 947 communicates and exchanges data with the kernel 941.

Furthermore, the middleware 943 may handle one or more task requests received from the application program 947 according to a priority order. For example, the middleware 943 may assign at least one application program 947 a priority for using the system resources (e.g., the bus 910, the processor 920, the memory 930, or the like) of the electronic device 901. For example, the middleware 943 may handle the one or more task requests according to the priority assigned to the at least one application, thereby performing scheduling or load balancing with respect to the one or more task requests.

The API 945, which is an interface for allowing the application 947 to control a function provided by the kernel 941 or the middleware 943, includes, for example, at least one interface or function (e.g., instructions) for file control, window control, image processing, character control, or the like.

The input/output interface 950 may serve to transfer an instruction or data input from a user or another external device to another element of the electronic device 901. Furthermore, the input/output interface 950 may output instructions or data received from another element of the electronic device 901 to the user or another external device.

The display 960 may include a liquid crystal display (LCD), a light-emitting diode (LED) display, an organic light-emitting diode (OLED) display, a microelectromechanical systems (MEMS) display, or an electronic paper display. The display 960 may present various content (e.g., a text, an image, a video, an icon, a symbol, or the like) to the user. The display 960 may include a touch screen, and may receive a touch, gesture, proximity or hovering input from an electronic pen or a part of a body of the user.

The communication interface 970 may set communications between the electronic device 901 and a first external electronic device 902, a second external electronic device 904, or a server 906. For example, the communication interface 970 may be connected to a short-range communication 964 to communicate with the first external electronic device 902 and may be connected to a network 962 via wireless communications or wired communications to communicate with the second external electronic device 904 or the server 906.

The wireless communications may employ cellular communication protocols, such as LTE, LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include the short-range communication 964. The short-range communication 964 may include at least one of Wi-Fi, Bluetooth (BT), Bluetooth low energy (BLE), Zigbee, NFC, magnetic stripe transmission (MST), and GNSS.

The MST may generate pulses according to transmission data and the pulses may generate electromagnetic signals. The electronic device 901 may transmit the electromagnetic signals to a reader device, such as a POS device. The POS device may detect the magnetic signals by using an MST reader and restore data by converting the detected electromagnetic signals into electrical signals.

The GNSS may include at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like.

The network 962 may include at least one of telecommunications networks, for example, a computer network (e.g., local area network (LAN) or wide area network (WAN)), the Internet, or a telephone network.

The types of the first external electronic device 902 and the second external electronic device 904 may be the same as or different from the type of the electronic device 901. The server 906 may include a group of one or more servers. A portion or all of operations performed in the electronic device 901 may be performed in one or more other external electronic devices (e.g., the first electronic device 902, the second external electronic device 904, or the server 906). When the electronic device 901 should perform a certain function or service automatically or in response to a request, the electronic device 901 may request at least a portion of functions related to the function or service from another device instead of or in addition to performing the function or service for itself. The other electronic device may perform the requested function or additional function, and may transfer a result of the performance to the electronic device 901. The electronic device 901 may use a received result itself or additionally process the received result to provide the requested function or service. To this end, for example, a cloud computing technology, a distributed computing technology, or a client-server computing technology may be used.

Figure 10:
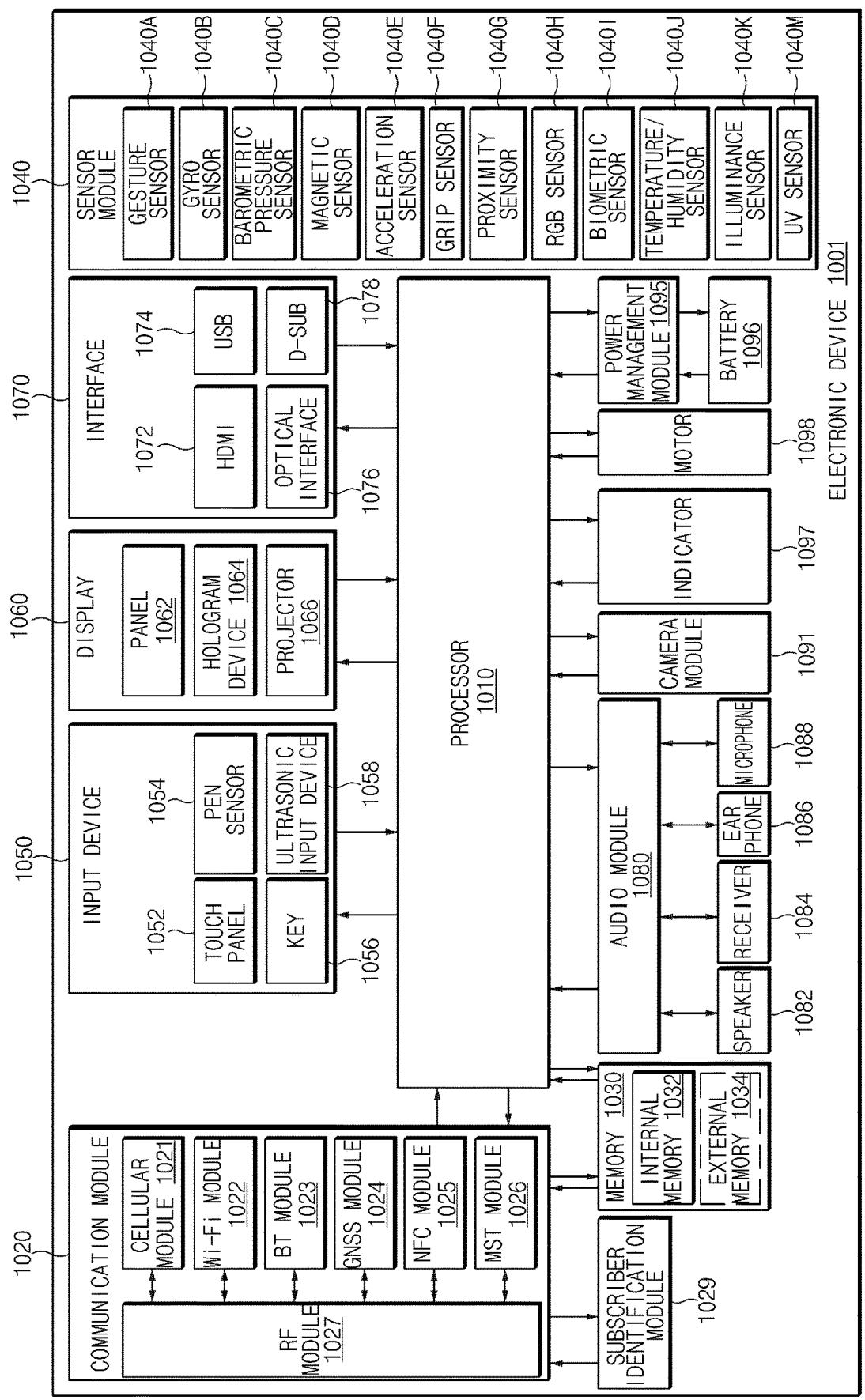
FIG. 10 is a block diagram of a configuration of an electronic device, according to an embodiment of the present disclosure.

FIG. 10 is a block diagram of a configuration of an electronic device, according to an embodiment of the present disclosure.

Referring to FIG. 10, an electronic device 1001 is provided. The electronic device 1001 includes at least one processor (e.g., AP) 1010, a communication module 1020, a subscriber identification module (SIM) 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may run an operating system or an application program so as to control a plurality of hardware or software elements connected to the processor 1010, and may process various data and perform operations. The processor 1010 may be implemented with, for example, a system on chip (SoC). The processor 1010 may further include a graphic processing unit (GPU) and/or an image signal processor (ISP). The processor 1010 may load, on a volatile memory, an instruction or data received from at least one of other elements (e.g., a nonvolatile memory) to process the instruction or data, and may store various data in a nonvolatile memory.

The communication module 1020 may include a cellular module 1021, a Wi-Fi module 1022, a BT module 1023, a GNSS module 1024 (e.g., a GPS module, a GLONASS module, a BeiDou module, or a Galileo module), a NFC module 1025, a MST module 1026, and a radio frequency (RF) module 1027.

The cellular module 1021 may provide a voice call service, a video call service, a text message service, or an Internet service through a communication network. The cellular module 1021 may identify and authenticate the electronic device 1001 in the communication network using the subscriber identification module 1029 (e.g., a SIM card). The cellular module 1021 may perform at least a part of functions that may be provided by the processor 1010. The cellular module 1021 may include a communication processor (CP).

Each of the Wi-Fi module 1022, the Bluetooth module 1023, the GNSS module 1024 and the NFC module 1025 may include a processor for processing data transmitted/received through the modules. At least a part of the cellular module 1021, the Wi-Fi module 1022, the Bluetooth module 1023, the GNSS module 1024, and the NFC module 1025 may be included in a single integrated chip (IC) or IC package.

The RF module 1027 may transmit/receive, for example, communication signals (e.g., RF signals). The RF module 1027 may include a transceiver, a power amp module (PAM), a frequency filter, a low noise amplifier (LNA), an antenna, or the like. Alternatively, at least one of the cellular module 1021, the Wi-Fi module 1022, the Bluetooth module 1023, the GNSS module 1024, or the NFC module 1025 may transmit/receive RF signals through a separate RF module.

The SIM 1029 may include an embedded SIM and/or a card containing the subscriber identity module, and may include unique identification information (e.g., an integrated circuit card identifier (ICCID)) or subscriber information (e.g., international mobile subscriber identity (IMSI)).

The memory 1030 may include an internal memory 1032 or an external memory 1034.

The internal memory 1032 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive, such as a compact flash (CF), a secure digital (SD), a micro-SD, a mini-SD, an extreme digital (xD), a multimedia card (MMC), a memory stick, or the like. The external memory 1034 may be operatively and/or physically connected to the electronic device 1001 through various interfaces.

The sensor module 1040 may measure physical quantity or detect an operation state of the electronic device 1001 so as to convert measured or detected information into an electrical signal. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a red/green/blue (RGB) sensor 1040H, a biometric sensor 1040I, a temperature/humidity sensor 1040J, an illuminance sensor 1040K, or an ultraviolet (UV) sensor 1040M. Additionally or alternatively, the sensor module 1040 may include an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. The electronic device 1001 may further include a processor configured to control the sensor module 1040 as a part of the processor 1010 or separately, so that the sensor module 1040 is controlled while the processor 1010 is in a sleep state.

The input device 1050 may include a touch panel 1052, a (digital) pen sensor 1054, a key 1056, or an ultrasonic input device 1058.

The touch panel 1052 may employ at least one of capacitive, resistive, infrared, and ultraviolet sensing methods. The touch panel 1052 may further include a control circuit. The touch panel 1052 may further include a tactile layer so as to provide a haptic feedback to a user.

The (digital) pen sensor 1054 may include a sheet for recognition which is a part of a touch panel or is separate.

The key 1056 may include a physical button, an optical button, or a keypad.

The ultrasonic input device 1058 may sense ultrasonic waves generated by an input tool through a microphone 1088 so as to identify data corresponding to the ultrasonic waves sensed.

The display 1060 may include a panel 1062, a hologram device 1064, or a projector 1066.

The panel 1062 may be flexible, transparent, or wearable. The panel 1062 and the touch panel 1052 may be integrated into a single module.

The hologram device 1064 may display a stereoscopic image in the air using a light interference phenomenon.

The projector 1066 may project light onto a screen so as to display an image. The screen may be disposed in the inside or the outside of the electronic device 1001.

The display 1060 may further include a control circuit for controlling the panel 1062, the hologram device 1064, or the projector 1066.

The interface 1070 may include an HDMI 1072, a USB 1074, an optical interface 1076, or a D-subminiature (D-sub) 1078. Additionally or alternatively, the interface 1070 may include a mobile high-definition link (MHL) interface, an SD card/multi-media card (MMC) interface, or an infrared data association (IrDA) interface.

The audio module 1080 may convert a sound into an electrical signal or vice versa. The audio module 1080 may process sound information input or output through a speaker 1082, a receiver 1084, an earphone 1086, or the microphone 1088.

The camera module 1091 is, a device for shooting a still image or a video. The camera module 1091 may include at least one image sensor (e.g., a front sensor or a rear sensor), a lens, an ISP, or a flash (e.g., an LED or a xenon lamp).

The power management module 1095 may manage power of the electronic device 1001. The power management module 1095 may include a power management integrated circuit (PMIC), a charger integrated circuit (IC), or a battery gauge. The PMIC may employ a wired and/or wireless charging method.

The wireless charging method may include a magnetic resonance method, a magnetic induction method, an electromagnetic method, or the like. An additional circuit for wireless charging, such as a coil loop, a resonant circuit, a rectifier, or the like, may be further included.

The battery gauge may measure a remaining capacity, a voltage, current, or temperature of the battery 1096. The battery 1096 may include a rechargeable battery and/or a solar battery.

The indicator 1097 may display a specific state of the electronic device 1001 or a part thereof (e.g., the processor 1010), such as a booting state, a message state, a charging state, or the like.

The motor 1098 may convert an electrical signal into a mechanical vibration, and may generate a vibration or haptic effect.

A processing device (e.g., a GPU) for supporting a mobile TV may be included in the electronic device 1001. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of the electronic device 1001. The electronic device 1001 may include at least one of the elements described herein, and some elements may be omitted or other additional elements may be added. Furthermore, some of the elements of the electronic device 1001 may be combined with each other so as to form one entity, so that the functions of the elements may be performed in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) of the present disclosure may be implemented as instructions stored in a computer-readable storage medium in the form of a program module. In the case where the instructions are performed by the processor 920, the processor 920 may perform functions corresponding to the instructions. The computer-readable storage medium may be, for example, the memory 930.

The computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments, an electronic device includes a conductive pattern used as a radiator for wireless communication, a feeding unit connected with the conductive pattern, a ground unit connected with the conductive pattern, a first impedance matching circuit disposed in a first area adjacent to the feeding unit and electrically connected to the conductive pattern, a second impedance matching circuit disposed in a second area adjacent to the conductive pattern and electrically connected to the conductive pattern and a control unit configured to match impedance by controlling at least one of the first impedance matching circuit and the second impedance matching circuit by a closed-loop scheme.

According to various embodiments, when matching impedance by controlling at least one of the first impedance matching circuit and the second impedance matching circuit by a closed-loop scheme, if a measured input impedance at the first area is included in a first range, the control unit dynamically matches impedance by controlling the first impedance matching circuit, and if the measured input impedance is included in a second range, the control unit dynamically matches impedance by controlling the first impedance matching circuit and the second impedance matching circuit.

The first impedance matching circuit and the second impedance matching circuit are implemented with respective chips having the same configuration.

The chip includes one or more variable capacitors and a plurality of switches controlled by the control unit.

The first impedance matching circuit includes a first variable capacitor and a second variable capacitor; and first to third switches.

The first switch is connected between the feeding unit and the conductive pattern, the second switch is connected between the conductive pattern and the ground unit, the first variable capacitor is connected in series between the feeding unit and the conductive pattern, and the second variable capacitor and the third switch are connected in series between the feeding unit and the ground unit.

The first switch is connected between the feeding unit and the conductive pattern, the second switch is connected between the conductive pattern and the ground unit, the first variable capacitor and the third switch are connected in series between the feeding unit and the conductive pattern, and the second variable capacitor is connected between the feeding unit and the ground unit.

The first impedance matching circuit includes a first variable capacitor, and first to fourth switches.

The first switch is connected between the feeding unit and the conductive pattern, the second switch is connected between the conductive pattern and the ground unit, the first variable capacitor and the third switch are connected in series between the feeding unit and the conductive pattern, and the fourth switch is connected between a connection point of the first variable capacitor and the third switch and the ground unit.

The second area is an area in which an electrical field is formed between the conductive pattern and the ground unit.

The conductive pattern is a metal frame in which at least part of an outer housing of the electronic device is exposed.

At least part of the conductive pattern is exposed to a surface that is perpendicular to a surface on which a display of the electronic device is disposed.

The conductive pattern is separated into a plurality of patterns through one or more non-conductive patterns.

Some of the plurality of patterns constitute a first antenna transmitting and receiving a signal of a first frequency band, and the remaining patterns thereof constitute a second antenna transmitting and receiving a signal of a second frequency band.

The control unit determines a mode for impedance matching on the basis of an input impedance value measured at a point adjacent to the feeding unit.

The control unit determines the mode on the basis of an area on a Smith chart corresponding to the input impedance value.

The control unit distinguishes from a first mode corresponding to a first area surrounding a periphery of a matching area of the Smith chart and a second mode corresponding to a second area surrounding a periphery of the first area, to match impedance.

The control unit controls the first impedance matching circuit to match input impedance, in the first mode.

The control unit controls the first impedance matching circuit and the second impedance matching circuit to match input impedance, in the second mode.

The control unit includes a CP for wireless communication.

According to various embodiments, an antenna for wireless communication includes a conductive pattern used as a radiator for wireless communication, a feeding unit connected with the conductive pattern, a ground unit connected with the conductive pattern, a first impedance matching circuit disposed in a first area adjacent to the feeding unit and electrically connected to the conductive pattern, a second impedance matching circuit disposed in a second area adjacent to the conductive pattern and electrically connected to the conductive pattern and a control unit configured to match impedance by controlling the first impedance matching circuit and the second impedance matching circuit by a closed-loop scheme.

The second area is an area in which an electrical field is formed between the conductive pattern and the ground unit.

According to various embodiments, a communication method, which is performed in an electronic device including a conductive pattern, includes transmitting and receiving a wireless communication signal to and from an external device by using the conductive pattern, measuring input impedance at a first area adjacent to a feeding unit connected with the conductive pattern, dynamically matching impedance by controlling a first impedance matching circuit disposed in the first area, if the measured input impedance is included in a first range and dynamically matching impedance by controlling the first impedance matching circuit and a second impedance matching circuit disposed in a second area adjacent to the conductive pattern, if the measured input impedance is included in a second range.

A change in input impedance in the second range is larger than a change in input impedance in the first range.

While the present disclosure has been shown and described with reference to various embodiments thereof, it will be understood by those skilled in the art that various changes in form and details may be made therein without departing from the spirit and scope of the present disclosure, which is defined, not by the detailed description and embodiments, but by the appended claims and their equivalents.

What is claimed is:

1. An electronic device comprising:
    a conductive pattern configured as a radiator for wireless communication and forming at least part of a metal frame of the electronic device exposed to an outside;
    a feeding unit;
    an impedance measurement unit;
    a first impedance matching circuit disposed in a first area adjacent to the feeding unit, wherein a first end of the first impedance matching circuit is connected to the feeding unit, and a second end of the first impedance matching circuit is connected to the conductive pattern, wherein the first impedance matching circuit includes a first variable capacitor connected between the feeding unit and the conductive pattern, a first switch connected between the feeding unit and the conductive pattern, a second switch connected between the conductive pattern and a ground, and a third switch connected between the feeding unit and the ground;
    a second impedance matching circuit disposed in a second area adjacent to the conductive pattern, wherein a first end of the second impedance matching circuit is connected to the conductive pattern and a second end of the second impedance matching circuit is connected to the ground; and
    a control unit configured to:
        determine a mode for impedance matching based on an input impedance value measured via the impedance measurement unit;
        if the determined mode is a first mode, perform the impedance matching by using the first impedance matching circuit; and
        if the determined mode is a second mode different from the first mode, perform the impedance matching by using the first impedance matching circuit and the second impedance matching circuit.

2. The electronic device of claim 1, wherein the first impedance matching circuit is implemented as at least part of a first chip.

3. The electronic device of claim 2, wherein the second impedance matching circuit is implemented as at least part of a second chip separate from the first chip.

4. The electronic device of claim 3, wherein the first chip and the second chip have a same configuration.

5. The electronic device of claim 1, wherein the second area is an area closer to the conductive pattern than to the feeding unit.

6. The electronic device of claim 1, wherein the conductive pattern forms at least part of a side surface of the electronic device.

7. The electronic device of claim 1, wherein the conductive pattern includes a first conductive pattern and a second conductive pattern electrically separated from each other.

8. The electronic device of claim 7, wherein the first conductive pattern forms a first antenna radiator configured to transmit or receive a first signal corresponding to a first frequency band, and the second conductive pattern forms a second antenna configured to transmit or receive a second signal corresponding to a second frequency band at least partially different from the first frequency band.

9. The electronic device of claim 1, wherein the second impedance matching circuit includes:
a fourth switch, a fifth switch, and a sixth switch connected in parallel to each other between a first portion and a second portion of the conductive pattern; and
a second variable capacitor connected between the first portion and the fourth switch.

10. The electronic device of claim 1, wherein the control unit is configured to:
perform the impedance matching according to a closed loop scheme.

11. A communication chip comprising:
a control unit configured to:
determine a mode for impedance matching for a portable communication device in which the communication chip is to be disposed, the determining based on an input impedance value measured via an impedance measurement unit included in the portable communication device;
if the determined mode is a first mode, perform the impedance matching by using a first impedance matching circuit; and
if the determined mode is a second mode different from the first mode, perform the impedance matching by using the first impedance matching circuit and a second impedance matching circuit,
wherein the first impedance matching circuit is connected between a portion of a metal frame of the portable communication device and a feeding portion configured to feed the portion of the metal frame such that the portion of the metal frame is to be used as an antenna radiator, and
wherein the second impedance matching circuit is connected between the portion of the metal frame and a ground.

12. The communication chip of claim 11, wherein the control unit is configured to:
perform the impedance matching according to a closed loop scheme.

* * * * *